United States Patent
Hu et al.

(10) Patent No.: US 12,342,162 B2
(45) Date of Patent: Jun. 24, 2025

(54) COMMUNICATION METHOD, APPARATUS, AND SYSTEM FOR AUTOMATIC ONBOARDING OF A TERMINAL DEVICE

(71) Applicant: Huawei Technologies Co., Ltd., Shenzhen (CN)

(72) Inventors: Li Hu, Shanghai (CN); Rong Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 325 days.

(21) Appl. No.: 17/954,759

(22) Filed: Sep. 28, 2022

(65) Prior Publication Data
US 2023/0021215 A1    Jan. 19, 2023

Related U.S. Application Data

(63) Continuation of application No. PCT/CN2020/081957, filed on Mar. 29, 2020.

(51) Int. Cl.
H04W 12/06    (2021.01)
H04L 9/40     (2022.01)
H04W 8/18     (2009.01)

(52) U.S. Cl.
CPC ......... H04W 12/06 (2013.01); H04L 63/0869 (2013.01); H04W 8/18 (2013.01)

(58) Field of Classification Search
CPC ..... H04W 12/06; H04W 8/18; H04W 12/062; H04W 12/069; H04W 60/00; H04W 48/16; H04L 63/0869
See application file for complete search history.

(56) References Cited

U.S. PATENT DOCUMENTS

| 2021/0058784 A1* | 2/2021 | Kedalagudde | ........ H04W 76/12 |
| 2021/0136070 A1  | 5/2021 | Hu et al.   |                    |
| 2022/0240210 A1* | 7/2022 | Lai         | ........ H04W 60/00 |

FOREIGN PATENT DOCUMENTS

| CN | 110808942 A    | 2/2020 |
| WO | 2019122495 A1  | 6/2019 |

(Continued)

OTHER PUBLICATIONS

"Solution for UE onboarding and remote provisioning," Source: Samsung, Document for: Approval, Agenda Item: 8.3, Work Item / Release: FS_eNPN / Rel-17, SA WG2 Temporary Document, SA WG2 Meeting #136-AH, S2-2000764 (revision of S2-200xxxx), Incheon, South Korea, Jan. 13-17, 2020, 3 pages.

(Continued)

*Primary Examiner* — Brandon J Miller
(74) *Attorney, Agent, or Firm* — Slater Matsil, LLP

(57) ABSTRACT

A communication method and apparatus are provided, to implement automatic onboarding when no network-side information is configured on a terminal device. The method includes: The terminal device obtains auxiliary authentication information that includes identification information of one or more networks; determines access information of a first network based on first temporary authentication information and identification information of the first network, where the first network is any one of the one or more networks; triggers mutual temporary authentication with the first network based on the access information of the first network; and receives configuration information of the first network from the first network when the mutual temporary authentication succeeds. The terminal device may trigger the mutual temporary authentication with the first network based on the access information of the first network.

21 Claims, 10 Drawing Sheets

(56) References Cited

FOREIGN PATENT DOCUMENTS

| WO | 2019165406 | A1 | | 8/2019 | | |
| WO | 2019194242 | A1 | | 10/2019 | | |
| WO | 2020036364 | A1 | | 2/2020 | | |
| WO | WO-2021229474 | A1 | * | 11/2021 | ............ | H04W 12/06 |
| WO | WO-2021236078 | A1 | * | 11/2021 | | |

OTHER PUBLICATIONS

"3rd Generation Partnership Project; Technical Specification Group Core Network and Terminals; Numbering, addressing and identification (Release 16)," 3GPP TS 23.003 V16.1.0, Dec. 2019, 139 pages.

"3rd Generation Partnership Project; Technical Specification Group Core Network and Terminals; Non-Access-Stratum (NAS) functions related to Mobile Station (MS) in idle mode (Release 16)," 3GPP TS 23.122 V16.5.0, Mar. 2020, 80 pages.

"3rd Generation Partnership Project; Technical Specification Group Services and System Aspects; System architecture for the 5G System (5GS); Stage 2 (Release 16)," 3GPP TS 23.501 V16.4.0, Mar. 2020, 430 pages.

"3rd Generation Partnership Project; Technical Specification Group Services and System Aspects; Procedures for the 5G System (5GS); Stage 2 (Release 16)," 3GPP TS 23.502 V16.4.0, Mar. 2020, 582 pages.

"3rd Generation Partnership Project; Technical Specification Group Core Network and Terminals; Non-Access-Stratum (NAS) protocol for Evolved Packet System (EPS); Stage 3 (Release 16)," 3GPP TS 24.301 V16.4.0, Mar. 2020, 573 bages.

3GPP TS 24.501 V16.4.0 (Mar. 2020), 3rd Generation Partnership Project; Technical Specification Group Core Network and Terminals; Non-Access-Stratum (NAS) protocol for 5G System (5GS); Stage 3 (Release 16), 3GPP TS 24.501 V16.4.0, Mar. 2020, 666 pages.

"3rd Generation Partnership Project; Technical Specification Group Services and System Aspects; Security architecture and procedures for 5G system (Release 16)," 3GPP TS 33.501 V16.2.0, Mar. 2020, 227 pages.

"3rd Generation Partnership Project; Technical Specification Group Radio Access Network; NR; NR and NG-RAN Overall Description; Stage 2 (Release 16)," 3GPP TS 38.300 V16.0.0, Dec. 2019, 101 pages.

"3rd Generation Partnership Project; Technical Specification Group Radio Access Network; NR; User Equipment (UE) procedures in Idle mode and RRC Inactive state (Release 15)," 3GPP TS 38.304 V15.6.0, Dec. 2019, 30 pages.

"3rd Generation Partnership Project; Technical Specification Group Radio Access Network; NR; Radio Resource Control (RRC) protocol specification (Release 15)," 3GPP TS 38.331 V15.8.0, Dec. 2019, 532 pages.

Dekok, A, "The Network Access Identifier," Internet Engineering Task Force (IETF), Request for Comments: 7542, Obsoletes: 4282, Category: Standards Track, ISSN: 2070-1721, May 2015, 30 pages.

"New Solution external authentication and authorization," Source: Huawei, HiSilicon, Document for: Approval, Agenda Item: 8.3, Work Item / Release: FS_eNPN] / [Rel-17], SA WG2 Temporary Document, SA WG2 Meeting #136, 82-1911668 (revision of S2-191xxxx), Reno, NV, USA, Nov. 18-22, 2019, 5 pages.

"Solution for UE onboarding and provisioning for SNPN access," Source: vivo, Document for: Approval, Agenda Item: 8.3, Work Item / Release: FS_eNPN / Rel-17, SA WG2 Temporary Document, SA WG2 Meeting #136AH, S2-2000136 (was S2-XXXXXXX), Incheon, Korea, Jan. 13-17, 2020, 2 pages.

"Control Plane based solution to onboarding KI#4," Source: Ericsson, Document for: Approval Agenda Item: 8.3, Work Item / Release: FS_eNPN / Rel-17, SA WG2 Temporary Document, 3GPP TSG-SA WG2 Meeting #136AH, S2-2000191, Incheon, Korea Jan. 13-18, 2020, 6 pages.

"Solution for key issue onboarding (for SNPN)," Source: OPPO, Spec: 3GPP TR 23.007-07 v0.2.0, Agenda item: 8.3, Document for: Approval, 3GPP TSG SA WG2 Meeting #136Adhoc, S2-2000326 (rev of S2-1911144), Incheon, Korea, Jan. 13-17, 2020, 2 pages.

"Solution for restricted access used for onboading and remote provisioning," Source: Qualcomm Incorporated, Document for: Discussion/Approval, Agenda Item: 8.3, Work Item / Release: FS_eNPN/Rel. 17, SA WG2 Meeting #136AH, S2-2000336 (was S2-20xxxx), Incheon, Republic of Korea, Jan. 13-17, 2020, 5 pages.

"Solution #X: UE Onboarding and Provisioning for a PNI-NPN," Source: Huawei, HiSilicon, Document for: Approval, Agenda Item: 8.3, Work Item / Release: FS_eNPN / Rel-17, SA WG2 Temporary Document, SA WG2 Meeting #136AH, S2-2000441 (revision of S2-200xxxx), Incheon, South Korea, Jan. 13-17, 2020, 5 pages.

"Solution for UE onboarding and remote provisioning for a PNI-NPN," Source: China Telecom, Document for: Approval, Agenda Item: 8.3, Work Item / Release: FS_eNPN / Rel-17, SA WG2 Temporary Document, SA WG2 Meeting #S2-136AH, S2-2000452, Incheon, Korea, Jan. 13-17, 2020, 2 pages.

"Solution for UE Onboarding and provisioning for an SNPN," Source: Ericsson?, Samsung?, Intel, OPPO?, Document for: Agreement, Agenda Item: 8.3, Work Item / Release: FS_eNPN / Rel-17, SA WG2 Temporary Document, SA WG2 Meeting #S2-136AH, S2-2000518, Jan. 13-17, 2020, Incheon, South Korea, 6 pages.

"Solution for Key Issue#2: User subscription data provisioning for SNPN UEs," Source: Tencent, Spec: 3GPP TR 23.700-07, Agenda item: 8.3, Document for: Approval, 3GPP TSG SA WG2 Meeting #136Adhoc, S2-2000602, Incheon, Korea, Jan. 13-17, 2020, 2 pages.

"New Solution UE onboarding and provisioning for SNPN subscription, " Source: Huawei, HiSilicon, Document for: Approval, Agenda Item: 8.3, Work Item / Release: [FS_eNPN] / [Rel-17], SA WG2 Temporary Document, SA WG2 Meeting #136AH, S2-2000645 (revision of), Incheon, South Korea, Jan. 13-17, 2020, 8 pages.

"Solution for UE Onboarding and provisioning for an SNPN," Source: Nokia, Nokia Shanghai Bell, Document for: Agreement, Agenda Item: 8.3, Work Item / Release: FS_eNPN / Rel-17, SA WG2 Temporary Document, SA WG2 Meeting #S2-136-AH, S2-2000667, Incheon, KR, Jan. 13-17, 2020, 6 pages.

"Solution of Key Issue #4: UE onboarding & remote provisioning," Source: Apple, Document for: Approval, Agenda Item: 8.3, Work Item / Release: FS_eNPN / Rel-17, SA WG2 Meeting #136-AH, S2-2000752 (revision of S2-20xxxxx), Incheon, South Korea, Jan. 13-17, 2020, 3 pages.

"Solution for SNPN subscription data provisioning," Source: Samsung, Document for: Approval, Agenda Item: 8.3, Work Item / Release: FS_eNPN / Rel-17, SA WG2 Temporary Document, SA WG2 Meeting #136-AH, S2-2000765 (revision of S2-200xxxx), Incheon, South Korea, Jan. 13-17, 2020, 2 pages.

"[Draft] LS on network instance of RAN ," Release: Rel-16, Work Item: 5GS_Ph1, Source: SA2, To: RAN3, 3GPP TSG SA WG2 Meeting #136AH, S2-2000861(revision of S2-200xxxx), Incheon, South Korea, Jan. 13-17, 2020, 1 page.

"Solution for UE onboarding and remote provisioning," Source: InterDigital Inc., Document for: Approval, Agenda Item: 8.3, Work Item / Release: FS_eNPN / Rel-17, SA WG2 Temporary Document, SA WG2 Meeting #136AH, S2-2000910, Incheon, KR, Jan. 13-17, 2020, 4 pages.

Qualcomm Incorporated, et al., "Solution for SNPN access using 3rd party credentials," 3GPP TSG-SA WG2 Meeting #136-AH, S2-2001527, Jan. 13-17, 2020, 8 pages, Incheon, Republic of Korea.

Qualcomm Inc. et al., "Solution for SNPN access using 3rd party credentials", 3GPP TSG SA WG2 Meeting #136-AH, S2-2000079, Incheon, Korea, Jan. 13-17, 2020, 8 pages.

Oppo et al., "Solution for remote provisioning for PNI-NPN UE with PLMN subscription", SA WG2 Meeting #136, S2-2000318, Incheon, Korea, Jan. 13-17, 2020, 6 pages.

\* cited by examiner

COMMUNICATION METHOD, APPARATUS, AND SYSTEM FOR AUTOMATIC ONBOARDING OF A TERMINAL DEVICE

CROSS-REFERENCE TO RELATED APPLICATIONS

This application is a continuation of International Application No. PCT/CN2020/081957, filed on Mar. 29, 2020, which is hereby incorporated by reference in its entirety.

TECHNICAL FIELD

This application relates to the field of communication technologies, and in particular, to a communication method, apparatus, and system.

BACKGROUND

A standalone non-public network (SNPN) is a non-public network that provides network functions without relying on a public land mobile network (PLMN). A terminal device may access the SNPN by using a 3rd generation partnership project (3GPP) technology. In the PLMN, a terminal device can access the PLMN only after onboarding. Currently, a user usually goes to a mobile service center for onboarding of a terminal device. A sales assistant needs to import related information of the terminal device into a network side, and provides a subscriber identity module (SIM) card for the user. The SIM card stores information about a network selected by the terminal device. After the user inserts the SIM card into the terminal device, the terminal device may select and access the corresponding network based on the information stored in the SIM card. However, this manner is inefficient, requires manual intervention, and is not automatic enough.

In addition, in an SNPN scenario, a large quantity of terminal devices may be small Internet of Things terminal devices. These terminal devices have no display screen and are large in quantity. If the existing onboarding manner in the PLMN is still used, onboarding efficiency is low, and cooperation of operation and maintenance personnel is required. In this case, how to securely perform onboarding on these terminal devices having no SNPN subscription data is a technical problem that urgently needs to be resolved currently.

SUMMARY

This application provides a communication method, apparatus, and system, to implement automatic onboarding when no network-side information is configured on a terminal device.

According to a first aspect, this application provides a communication method. The method may include: obtaining auxiliary authentication information; determining access information of a first network based on first temporary authentication information and identification information of the first network; triggering mutual temporary authentication with the first network based on the access information of the first network, where the auxiliary authentication information includes identification information of one or more networks, and the first network is any one of the one or more networks; and receiving configuration information of the first network from the first network when the mutual temporary authentication succeeds.

The method may be performed by a terminal apparatus. The terminal apparatus may be a terminal device or a module, for example, a chip, in the terminal device.

Based on the foregoing solution, the terminal apparatus may determine the access information of the first network based on the obtained auxiliary authentication information and the first temporary authentication information, to trigger the mutual temporary authentication with the first network based on the access information of the first network. After the mutual temporary authentication between the terminal apparatus and the first network succeeds, the terminal apparatus may obtain, from the first network, the configuration information for accessing the first network, so that the terminal apparatus can access the first network based on the configuration information. In this way, the terminal apparatus can securely obtain subscription information of the first network when no network-side information is configured on the terminal apparatus.

Further, the configuration information of the first network includes network selection subscription information, and the network selection subscription information is used by the terminal apparatus to choose to access the first network.

The terminal apparatus can automatically access the first network by using the obtained network selection subscription information of the first network, and manual onboarding is not required, thereby helping improve onboarding efficiency.

In a possible implementation, the network selection subscription information includes one or more of a subscription permanent identifier (SUPI), a public land mobile network identifier (PLMN ID), a network identifier (NID), a routing indicator (routing ID), single network slice selection assistance information (NSSAI), and a data network name (DNN).

In a possible implementation, the configuration information of the first network further includes a long-term authentication credential, and the long-term authentication credential may be a credential used by the first network to authorize the terminal apparatus to access the first network.

When the mutual temporary authentication succeeds, the terminal apparatus determines identification information of a data network in which an online subscription server is located, the terminal apparatus sends the identification information of the data network to a session management function network element, and the terminal apparatus obtains the long-term authentication credential from the online subscription server through a user plane tunnel.

Optionally, the auxiliary authentication information further includes the identification information of the data network in which the online subscription server is located. The terminal apparatus obtains the identification information of the data network from the auxiliary authentication information.

In a possible implementation, the access information of the first network may include any one of the following: an identifier of a third temporary authentication credential, where the identifier of the third temporary authentication credential is determined based on an identifier of first temporary authentication credential in the first temporary authentication information; an identifier of a third temporary authentication credential and the identification information of the first network; an identifier of a third temporary authentication credential and a type of the access information of the first network, where the type of the access information of the first network indicates that the access information of the first network is used for temporary authentication; an identifier of a third temporary authentication credential and identification information of an authentication, authorization, and accounting function network element; an identifier of a third temporary authentication credential, the identification information of the first network, and a type of the access information of the first network; an identifier of a third temporary authentication credential, the identification information of the first network, and identification information of an authentication, authorization, and accounting function network element; an identifier of a third temporary authentication credential, a type of the access information of the first network, and identification information of an authentication, authorization, and accounting function network element; or an identifier of a third temporary authentication credential, the identification information of the first network, identification information of an authentication, authorization, and accounting function network element, and a type of the access information of the first network.

When the access information of the first network includes the type of the access information of the first network, because the identifier of the third temporary authentication credential is preconfigured by a manufacturer of the terminal apparatus, the identifier may be duplicate with the SUPI (allocated by the first network) that has been stored in the first network, and introducing a specific type of the access information can avoid a problem that an incorrect ID is found due to duplicate user identities.

The identification information of the first network includes the PLMN ID. The identification information of the authentication, authorization, and accounting function network element includes the routing indicator (routing ID). The identifier of the first temporary authentication credential includes a permanent equipment identifier (PEI) or an international mobile equipment identity (IMEI).

In a possible implementation, the terminal apparatus sends the access information of the first network to the authentication, authorization, and accounting function network element through an authentication anchor, and receives an authentication request message from the authentication anchor, where the authentication request message includes first verification information. The terminal apparatus performs temporary authentication on the first verification information based on the first temporary authentication information.

Further, the first verification information includes a first message authentication code. The terminal apparatus may obtain a second temporary symmetric key based on the first temporary authentication information, generate a second message authentication code based on the second temporary symmetric key, and verify the first message authentication code based on the second message authentication code.

In a possible implementation, when the first message authentication code is the same as the second message authentication code, a third challenge value is generated based on the second temporary symmetric key, where the third challenge value is used by the authentication anchor to perform temporary authentication on the terminal apparatus. The terminal apparatus sends an authentication response message to the authentication anchor, where the authentication response message includes the third challenge value.

In a possible implementation, the first temporary authentication information includes a first private key of a terminal apparatus, and the first verification information includes a second public key of the authentication, authorization, and accounting function network element. The terminal apparatus generates the second temporary symmetric key based on the first private key and the second public key.

In a possible implementation, the first temporary authentication information further includes the first temporary authentication credential, the first temporary authentication credential includes a verification parameter and a private key of a certificate of the terminal apparatus, and the first verification information includes a signature of a certificate of the authentication, authorization, and accounting function network element and a third message authentication code. The terminal apparatus verifies the signature of the certificate of the authentication, authorization, and accounting function network element based on the verification parameter. When the verification on the signature of the certificate of the authentication, authorization, and accounting function network element succeeds, the terminal apparatus verifies the third message authentication code based on a public key of the certificate of the authentication, authorization, and accounting function network element.

Further, when the terminal apparatus successfully verifies the third message authentication code, the terminal apparatus generates a fourth message authentication code based on the private key of the certificate of the terminal apparatus. The terminal apparatus sends an authentication response message to the authentication anchor, where the authentication response message includes the fourth message authentication code and a first certificate.

In a possible implementation, the mutual temporary authentication includes fifth-generation authentication and key agreement (5G authentication and key agreement, AKA) or extensible authentication protocol (EAP) authentication and key agreement AKA'.

When the mutual temporary authentication fails, the terminal apparatus determines access information of a second network based on the first temporary authentication information and identification information of the second network, where the second network is any one of the one or more networks that is different from the first network. The terminal apparatus triggers mutual temporary authentication with the second network based on the access information of the second network.

The auxiliary authentication information of the terminal apparatus includes the identification information of the one or more networks, and the terminal apparatus may attempt to access one or more of the networks according to a specific rule. Before obtaining configuration information of a network X, the terminal apparatus may attempt to access the network X based on the auxiliary authentication information. If the terminal apparatus cannot complete mutual temporary authentication with the network X, the terminal apparatus attempts to access another network. If the terminal apparatus can complete mutual temporary authentication with the network X, the network X delivers configuration information of the network X to the terminal apparatus. Subsequently, the terminal apparatus may directly access the network X based on the configuration information of the network X.

In this way, the terminal apparatus can automatically select a correct network, and obtain configuration information of the correct network, to successfully implement onboarding.

Further, the terminal apparatus may receive an access reject message from the first network, and/or the terminal apparatus fails to authenticate the first network. The access reject message may include cause information for rejecting access.

In a possible implementation, the auxiliary authentication information further includes onboarding indication information corresponding to the one or more networks. The terminal apparatus selects one network as the first network from the networks including the onboarding indication information.

The first network is selected from the auxiliary authentication information including the onboarding indication information and is accessed, to avoid selecting a network that does not support an onboarding procedure. This improves the onboarding efficiency.

In a possible implementation, the terminal apparatus receives the auxiliary authentication information broadcast by an access network device.

When onboarding has not been performed on the terminal apparatus, the terminal apparatus has no configuration information locally, and cannot select and access a network based on the configuration information. Therefore, when the terminal apparatus has no subscription information, the broadcast auxiliary authentication information can help the terminal apparatus obtain a parameter required for network access, so that the terminal apparatus can attempt to access the network.

In a possible implementation, the identifier of the third temporary authentication credential is a confusion value of the first temporary authentication credential.

Determining the confusion value of the first temporary authentication credential as the identifier of the third temporary authentication credential helps protect privacy of the terminal apparatus.

According to a second aspect, this application provides a communication method. The method includes: An authentication, authorization, and accounting function network element receives access information of a first network from a terminal apparatus, determines second temporary authentication information based on the access information of the first network, and performs mutual temporary authentication with the terminal apparatus based on the second temporary authentication information, where the access information of the first network is determined by the terminal apparatus based on first temporary authentication information and identification information of the first network.

Based on the foregoing solution, the authentication, authorization, and accounting function network element performs mutual temporary authentication with the terminal apparatus based on the second temporary authentication information. When the mutual temporary authentication succeeds, the terminal apparatus may obtain, from the first network, configuration information for accessing the first network, so that the terminal apparatus can access the first network based on the configuration information. In this way, the terminal apparatus can securely obtain subscription information of the first network when no network-side information is configured on the terminal apparatus.

In a possible implementation, the access information of the first network may include any one of the following: an identifier of a third temporary authentication credential, where the identifier of the third temporary authentication credential is determined based on an identifier of first temporary authentication credential in the first temporary authentication information; an identifier of a third temporary authentication credential and the identification information of the first network; an identifier of a third temporary authentication credential and a type of the access information, where the type of the access information indicates that the access information is used for temporary authentication; an identifier of a third temporary authentication credential and identification information of an authentication, authorization, and accounting function network element; an identifier of a third temporary authentication credential, the identification information of the first network, and a type of the access information; an identifier of a third temporary authentication credential, the identification information of the first network, and identification information of an authentication, authorization, and accounting function network element; an identifier of a third temporary authentication credential, a type of the access information, and identification information of an authentication, authorization, and accounting function network element; or an identifier of a third temporary authentication credential, the identification information of the first network, identification information of an authentication, authorization, and accounting function network element, and a type of the access information of the first network.

The identification information of the first network includes a PLMN ID. The identification information of the authentication, authorization, and accounting function network element includes a routing ID. The identifier of the first temporary authentication credential includes a PEI or an IMEI.

In a possible implementation, the authentication, authorization, and accounting function network element generates first verification information based on the access information of the first network. The authentication, authorization, and accounting function network element sends the first verification information to an authentication anchor.

In a possible implementation, the first verification information includes a first message authentication code and a first challenge value. The authentication, authorization, and accounting function network element determines second temporary authentication information based on the access information of the first network. The authentication, authorization, and accounting function network element obtains a first temporary symmetric key based on the second temporary authentication information. The authentication, authorization, and accounting function network element separately generates the first message authentication code and the first challenge value based on the first temporary symmetric key. The authentication, authorization, and accounting function network element sends the first message authentication code and the first challenge value to the authentication anchor.

In a possible implementation, the second temporary authentication information further includes a temporary algorithm. The authentication, authorization, and accounting function network element generates the first temporary symmetric key according to the temporary algorithm.

In a possible implementation, the second temporary authentication information includes a first public key of the terminal apparatus. The authentication, authorization, and accounting function network element generates a second public key of the authentication, authorization, and accounting function network element and a second private key of the authentication, authorization, and accounting function network element. The authentication, authorization, and accounting function network element generates the first temporary symmetric key based on the second private key and the first public key.

In a possible implementation, the second temporary authentication information further includes the temporary algorithm, and the temporary algorithm includes a key agreement algorithm and a temporary authentication algorithm. The authentication, authorization, and accounting function network element generates the second public key and the second private key of the authentication, authorization, and accounting function network element according to the key agreement algorithm. The authentication, authorization, and accounting function network element generates the first temporary symmetric key based on the temporary authentication algorithm, the second private key, and the first public key.

In a possible implementation, the first verification information further includes the second public key of the authentication, authorization, and accounting function network element. The authentication, authorization, and accounting function network element sends the second public key to the authentication anchor.

In a possible implementation, the authentication, authorization, and accounting function network element receives the second temporary authentication information from an onboarding device.

In a possible implementation, the access information of the first network includes the identifier of the third temporary authentication credential. The authentication, authorization, and accounting function network element searches for an identifier of a second temporary authentication credential that is the same as the identifier of the third temporary authentication credential, and determines temporary authentication information corresponding to the identifier of the second temporary authentication credential as the second temporary authentication information.

In a possible implementation, the access information of the first network further includes the type of the access information of the first network. The authentication, authorization, and accounting function network element determines, based on the type of the access information of the first network, that temporary authentication information needs to be searched for. The authentication, authorization, and accounting function network element searches for the identifier of the second temporary authentication credential that is the same as the identifier of the third temporary authentication credential, and determines the temporary authentication information corresponding to the identifier of the second temporary authentication credential as the second temporary authentication information.

In a possible implementation, the identifier of the third temporary authentication credential is a confusion value of the first temporary authentication credential.

According to a third aspect, this application provides a communication method. The method includes: An authentication anchor sends, to an authentication, authorization, and accounting function network element in a first network, access information of the first network that is from a terminal apparatus, where the access information of the first network is used to trigger the terminal apparatus and the authentication, authorization, and accounting function network element to perform mutual temporary authentication. When determining that the mutual temporary authentication between the terminal apparatus and the first network succeeds, the authentication anchor triggers a data management network element to send network selection subscription information of the first network to the terminal apparatus.

Based on this solution, after the authentication anchor determines that the mutual temporary authentication between the terminal apparatus and the first network succeeds, the first network can determine that the terminal apparatus that obtains the network selection subscription information is correct, and the terminal can determine that the first network that sends the network selection subscription information is correct.

In a possible implementation, the authentication anchor sends a subscription request indication to the data management network element, where the subscription request indication indicates the data management network element to send the network selection subscription information to the terminal apparatus.

In a possible implementation, the network selection subscription information includes one or more of an identifier of the first network, an archive address of a long-term authentication credential, a service parameter of the terminal apparatus, or long-term identification information of the terminal apparatus.

In a possible implementation, the access information of the first network may include any one of the following: an identifier of a third temporary authentication credential, where the identifier of the third temporary authentication credential is determined based on an identifier of first temporary authentication credential in first temporary authentication information; an identifier of a third temporary authentication credential and identification information of the first network; an identifier of a third temporary authentication credential and a type of the access information of the first network, where the type of the access information of the first network indicates that the access information of the first network is used for temporary authentication; an identifier of a third temporary authentication credential and identification information of the authentication, authorization, and accounting function network element; an identifier of a third temporary authentication credential, identification information of the first network, and a type of the access information of the first network; an identifier of a third temporary authentication credential, identification information of the first network, and identification information of the authentication, authorization, and accounting function network element; an identifier of a third temporary authentication credential, a type of the access information of the first network, and identification information of the authentication, authorization, and accounting function network element; or an identifier of a third temporary authentication credential, identification information of the first network, identification information of the authentication, authorization, and accounting function network element, and a type of the access information of the first network.

When the access information of the first network includes the type of the access information of the first network, because the identifier of the third temporary authentication credential is preconfigured by a manufacturer of the terminal apparatus, the identifier may be duplicate with a SUPI (allocated by the first network) that has been stored in the first network, and introducing a specific type of the access information can avoid a problem that an incorrect ID is found due to duplicate user identities.

When the access information of the first network includes the identification information of the first network, an AMF may select an AUSF based on the identification information (for example, a PLMN ID) of the network and the identification information (for example, a routing indicator (routing indicator, RI)) of the AAA. Further, the AUSF may select the AAA based on the identification information (the PLMN ID) of the network and the identification information (for example, the RI) of the AAA.

When the access information of the first network includes a SUPI type, and the SUPI type is a non-0 or non-1 value, and may indicate that the access information of the first network is used for the temporary authentication, or indicate that the access information of the first network is preconfigured by the manufacturer or not owned by the current network or that the RI is a default value, an AMF may select a specific AUSF from a local configuration.

In a possible implementation, the authentication anchor receives first verification information from the authentication, authorization, and accounting function network element. The authentication anchor sends an authentication request message to the terminal apparatus, where the authentication request message includes the first verification information. The authentication anchor receives an authentication response message from the terminal apparatus, where the authentication response message includes second verification information. When determining that the first verification information is the same as the second verification information, the authentication anchor determines that the mutual temporary authentication between the terminal apparatus and the first network succeeds.

In a possible implementation, the authentication anchor includes an authentication server network element and a mobility management network element, the first verification information includes a first challenge value or a second challenge value, and the second verification information includes a third challenge value. The authentication server network element receives the first challenge value from the authentication, authorization, and accounting function network element. The authentication server network element generates the second challenge value based on the first challenge value. The authentication server network element sends the second challenge value to the mobility management network element. The mobility management network element receives the third challenge value from the terminal apparatus. When determining that the second challenge value is the same as the third challenge value, the mobility management network element sends the third challenge value to the authentication server network element. When determining that the first challenge value is the same as the third challenge value, the authentication server network element determines that the mutual temporary authentication between the terminal apparatus and the first network succeeds.

In a possible implementation, the authentication anchor includes an authentication server network element and a mobility management network element, the first verification information includes a fourth challenge value, and the second verification information includes a fifth challenge value. The authentication server network element receives the fourth challenge value from the authentication, authorization, and accounting function network element. The authentication server network element sends the fourth challenge value to the mobility management network element. The mobility management network element receives the fifth challenge value from the terminal apparatus. The mobility management network element sends the fifth challenge value to the authentication server network element. When determining that the fourth challenge value is the same as the fifth challenge value, the authentication server network element determines that the mutual temporary authentication between the terminal apparatus and the first network succeeds.

In a possible implementation, the access information of the first network includes the identification information of the authentication, authorization, and accounting function network element. The authentication anchor receives the access information of the first network from the terminal apparatus. The authentication anchor determines the authentication, authorization, and accounting function network element based on the identification information of the authentication, authorization, and accounting function network element in the access information of the first network. The authentication anchor sends the access information of the first network to the authentication, authorization, and accounting function network element.

According to a fourth aspect, this application provides a communication apparatus. The communication apparatus has a function of implementing the terminal apparatus in the first aspect, the authentication, authorization, and accounting function network element in the second aspect, or the authentication anchor in the third aspect. The function may be implemented by hardware, or may be implemented by hardware executing corresponding software. The hardware or software includes one or more units or modules corresponding to the foregoing function.

In a possible implementation, the communication apparatus may be a terminal device, or may be a module, for example, a chip, a chip system, or a circuit, that can be used in the terminal device. For beneficial effects, refer to the descriptions in the first aspect. Details are not described herein again. The communication apparatus may include a transceiver and a processor. The processor may be configured to support the communication apparatus to perform a corresponding function of the terminal device described above. The transceiver is configured to support the communication apparatus to communicate with an access network device, an authentication anchor, and the like. The transceiver may be an independent receiver, an independent transmitter, a transceiver integrating receiving and sending functions, or an interface circuit. Optionally, the communication apparatus may further include a memory. The memory may be coupled to the processor, and stores program instructions and data that are necessary for the communication apparatus.

The transceiver is configured to obtain auxiliary authentication information, where the auxiliary authentication information includes identification information of one or more networks. The processor is configured to: determine access information of a first network based on first temporary authentication information and identification information of the first network, and trigger mutual temporary authentication with the first network based on the access information of the first network, where the first network is any one of the one or more networks.

In a possible implementation, the transceiver is further configured to receive configuration information of the first network from the first network when the mutual temporary authentication succeeds.

In a possible implementation, the access information of the first network includes any one of the following: an identifier of a third temporary authentication credential, where the identifier of the third temporary authentication credential is determined based on an identifier of first temporary authentication credential in the first temporary authentication information; an identifier of a third temporary authentication credential and the identification information of the first network; an identifier of a third temporary authentication credential and a type of the access information of the first network, where the type of the access information of the first network indicates that the access information of the first network is used for temporary authentication; an identifier of a third temporary authentication credential and identification information of an authentication, authorization, and accounting function network element; an identifier of a third temporary authentication credential, the identification information of the first network, and a type of the access information of the first network; an identifier of a third temporary authentication credential, the identification information of the first network, and identification information of an authentication, authorization, and accounting function network element; an identifier of a third temporary authentication credential, a type of the access information of the first network, and identification information of an authentication, authorization, and accounting function network element; or an identifier of a third temporary authentication credential, the identification information of the first network, identification information of an authentication, authorization, and accounting function network element, and a type of the access information of the first network.

In a possible implementation, the identification information of the first network includes a PLMN ID. The identification information of the authentication, authorization, and accounting function network element includes a routing ID. The identifier of the first temporary authentication credential includes a PEI or an IMEI.

In a possible implementation, the processor is specifically configured to send the access information of the first network to the authentication, authorization, and accounting function network element through the authentication anchor. The transceiver is specifically configured to receive an authentication request message from the authentication anchor, where the authentication request message includes first verification information. The processor is specifically configured to perform temporary authentication on the first verification information based on the first temporary authentication information.

In a possible implementation, the first verification information includes a first message authentication code. The processor is specifically configured to: obtain a second temporary symmetric key based on the first temporary authentication information, generate a second message authentication code based on the second temporary symmetric key, and verify the first message authentication code based on the second message authentication code.

In a possible implementation, when the first message authentication code is the same as the second message authentication code, the processor is further configured to generate a third challenge value based on the second temporary symmetric key, where the third challenge value is used by the authentication anchor to perform temporary authentication on the communication apparatus. The transceiver is further configured to send an authentication response message to the authentication anchor, where the authentication response message includes the third challenge value.

In a possible implementation, the first temporary authentication information includes a first private key of a terminal apparatus, and the first verification information includes a second public key of the authentication, authorization, and accounting function network element.

In a possible implementation, the processor is specifically configured to generate the second temporary symmetric key based on the first private key and the second public key.

In a possible implementation, the first temporary authentication information further includes the first temporary authentication credential, the first temporary authentication credential includes a verification parameter and a private key of a certificate of the communication apparatus, and the first verification information includes a signature of a certificate of the authentication, authorization, and accounting function network element and a third message authentication code. The processor is specifically configured to: verify the signature of the certificate of the authentication, authorization, and accounting function network element based on the verification parameter; and when the verification on the signature of the certificate of the authentication, authorization, and accounting function network element succeeds, verify the third message authentication code based on a public key of the certificate of the authentication, authorization, and accounting function network element.

In a possible implementation, when the verification on the third message authentication code succeeds, the processor is further configured to generate a fourth message authentication code based on the private key of the certificate of the communication apparatus. The transceiver is further configured to send an authentication response message to the authentication anchor, where the authentication response message includes the fourth message authentication code and a first certificate.

In a possible implementation, the mutual temporary authentication includes 5G AKA or EAP-AKA'.

In a possible implementation, the configuration information of the first network includes network selection subscription information, and the network selection subscription information is used by the communication apparatus to choose to access the first network.

In a possible implementation, the network selection subscription information includes one or more of a SUPI, the PLMN ID, a NID, the routing ID, NSSAI, and a DNN.

In a possible implementation, the configuration information of the first network further includes a long-term authentication credential, and the long-term authentication credential may be a credential used by the first network to authorize the terminal apparatus to access the first network. The transceiver is further configured to: determine identification information of a data network in which an online subscription server is located, send the identification information of the data network to a session management function network element, and obtain the long-term authentication credential from the online subscription server through a user plane tunnel.

In a possible implementation, the auxiliary authentication information further includes the identification information of the data network in which the online subscription server is located. The transceiver is further configured to obtain the identification information of the data network from the auxiliary authentication information.

In a possible implementation, the processor is further configured to: when the mutual temporary authentication fails, determine access information of a second network based on the first temporary authentication information and identification information of the second network, where the second network is any one of the one or more networks that is different from the first network; and trigger mutual temporary authentication with the second network based on the access information of the second network.

In a possible implementation, the auxiliary authentication information further includes onboarding indication information corresponding to the one or more networks. The processor is further configured to select one network as the first network from the networks including the onboarding indication information.

In a possible implementation, the transceiver is specifically configured to receive the auxiliary authentication information broadcast by the access network device.

In a possible implementation, the identifier of the third temporary authentication credential is a confusion value of the first temporary authentication credential.

In another possible implementation, the communication apparatus may be an authentication, authorization, and accounting function network element. For beneficial effects, refer to the descriptions in the second aspect. Details are not described herein again. The communication apparatus may include a transceiver and a processor. The processor may be configured to support the communication apparatus to perform a corresponding function of the authentication, authorization, and accounting function network element described above. The transceiver is configured to support the communication apparatus to communicate with another authentication anchor and the like. The transceiver may be an independent receiver, an independent transmitter, a transceiver integrating receiving and sending functions, or an interface circuit. Optionally, the communication apparatus may further include a memory. The memory may be coupled to the processor, and stores program instructions and data that are necessary for the communication apparatus.

In a possible implementation, the transceiver is configured to receive access information of a first network from a terminal apparatus. The processor is configured to trigger mutual temporary authentication with the communication apparatus based on the access information of the first network.

In a possible implementation, the access information of the first network includes any one of the following: an identifier of a third temporary authentication credential, where the identifier of the third temporary authentication credential is determined based on an identifier of first temporary authentication credential in first temporary authentication information; an identifier of a third temporary authentication credential and identification information of the first network; an identifier of a third temporary authentication credential and a type of the access information, where the type of the access information indicates that the access information is used for temporary authentication; an identifier of a third temporary authentication credential and identification information of an authentication, authorization, and accounting function network element; an identifier of a third temporary authentication credential, identification information of the first network, and a type of the access information; an identifier of a third temporary authentication credential, identification information of the first network, and identification information of an authentication, authorization, and accounting function network element; an identifier of a third temporary authentication credential, a type of the access information, and identification information of an authentication, authorization, and accounting function network element; or an identifier of a third temporary authentication credential, identification information of the first network, identification information of an authentication, authorization, and accounting function network element, and a type of the access information of the first network.

In a possible implementation, the identification information of the first network includes a PLMN ID. The identification information of the authentication, authorization, and accounting function network element includes a routing ID. The identifier of the first temporary authentication credential includes a PEI or an IMEI.

In a possible implementation, the processor is specifically configured to generate first verification information based on the access information of the first network. The transceiver is specifically configured to send the first verification information to the authentication anchor.

In a possible implementation, the first verification information includes a first message authentication code and a first challenge value. The processor is specifically configured to: determine second temporary authentication information based on the access information of the first network, obtain a first temporary symmetric key based on the second temporary authentication information, and separately generate the first message authentication code and the first challenge value based on the first temporary symmetric key. The transceiver is specifically configured to send the first message authentication code and the first challenge value to the authentication anchor.

In a possible implementation, the second temporary authentication information further includes a temporary algorithm. The processor is specifically configured to generate the first temporary symmetric key according to the temporary algorithm.

In a possible implementation, the second temporary authentication information includes a first public key of the terminal apparatus. The processor is specifically configured to: generate a second public key of the authentication, authorization, and accounting function network element and a second private key of the authentication, authorization, and accounting function network element, and generate the first temporary symmetric key based on the second private key and the first public key.

In a possible implementation, the second temporary authentication information further includes the temporary algorithm, and the temporary algorithm includes a key agreement algorithm and a temporary authentication algorithm. The processor is specifically configured to: generate the second public key and the second private key of the authentication, authorization, and accounting function network element according to the key agreement algorithm, and generate the first temporary symmetric key based on the temporary authentication algorithm, the second private key, and the first public key.

In a possible implementation, the first verification information further includes the second public key of the authentication, authorization, and accounting function network element. The transceiver is further configured to send the second public key to the authentication anchor.

In a possible implementation, the transceiver is further configured to receive the second temporary authentication information from an onboarding device.

In a possible implementation, the access information of the first network includes the identifier of the third temporary authentication credential. The processor is specifically configured to: search for an identifier of a second temporary authentication credential that is the same as the identifier of the third temporary authentication credential, and determine temporary authentication information corresponding to the identifier of the second temporary authentication credential as the second temporary authentication information.

In a possible implementation, the access information of the first network further includes the type of the access information of the first network. The processor is specifically configured to: determine, based on the type of the access information of the first network, that temporary authentication information needs to be searched for; and search for the identifier of the second temporary authentication credential that is the same as the identifier of the third temporary authentication credential, and determine the temporary authentication information corresponding to the identifier of the second temporary authentication credential as the second temporary authentication information.

In a possible implementation, the identifier of the third temporary authentication credential is a confusion value of the first temporary authentication credential.

In still another possible implementation, the communication apparatus may be an authentication anchor. For beneficial effects, refer to the descriptions in the third aspect. Details are not described herein again. The communication apparatus may include a transceiver and a processor. The processor may be configured to support the communication apparatus to perform a corresponding function of the authentication anchor described above. The transceiver is configured to support the communication apparatus to communicate with a terminal device, an authentication, authorization, and accounting function network element, and the like. The transceiver may be an independent receiver, an independent transmitter, a transceiver integrating receiving and sending functions, or an interface circuit. Optionally, the communication apparatus may further include a memory. The memory may be coupled to the processor, and stores program instructions and data that are necessary for the communication apparatus.

The transceiver is configured to send, to the authentication, authorization, and accounting function network element in a first network, access information of the first network that is from a terminal apparatus, where the access information of the first network is used to trigger the communication apparatus and the authentication, authorization, and accounting function network element to perform mutual temporary authentication. The processor is configured to: when it is determined that the mutual temporary authentication between the communication apparatus and the first network succeeds, trigger a data management network element to send network selection subscription information of the first network to the communication apparatus.

In a possible implementation, the processor collaborates with the transceiver, to send a subscription request indication to the data management network element when it is determined that the mutual temporary authentication between the communication apparatus and the first network succeeds, where the subscription request indication indicates the data management network element to send the network selection subscription information to the communication apparatus.

In a possible implementation, the network selection subscription information includes one or more of an identifier of the first network, an archive address of a long-term authentication credential, a service parameter of the communication apparatus, or long-term identification information of the communication apparatus.

In a possible implementation, the transceiver is specifically configured to: receive first verification information from the authentication, authorization, and accounting function network element; send an authentication request message to the communication apparatus, where the authentication request message includes the first verification information; and receive an authentication response message from the communication apparatus, where the authentication response message includes second verification information. The processor is specifically configured to determine, if it is determined that the first verification information is the same as the second verification information, that the mutual temporary authentication between the communication apparatus and the first network succeeds.

In a possible implementation, the access information of the first network includes identification information of the authentication, authorization, and accounting function network element. The transceiver is specifically configured to receive the access information of the first network from the communication apparatus. The processor is specifically configured to determine the authentication, authorization, and accounting function network element based on the identification information of the authentication, authorization, and accounting function network element in the access information of the first network. The transceiver is specifically configured to send the access information of the first network to the authentication, authorization, and accounting function network element.

According to a fifth aspect, this application provides a communication apparatus, configured to implement the method according to any one of the first aspect or the possible implementations of the first aspect, the method according to any one of the second aspect or the possible implementations of the second aspect, or the method according to any one of the third aspect or the possible implementations of the third aspect. The communication apparatus includes corresponding functional modules, respectively configured to implement the steps in the foregoing method. The function may be implemented by hardware, or may be implemented by hardware executing corresponding software. The hardware or software includes one or more modules corresponding to the foregoing function.

In a possible implementation, the communication apparatus may be a terminal device, and the communication apparatus may include a processing module and a transceiver module. These modules may perform corresponding functions of the terminal device in the foregoing method examples. For details, refer to the detailed descriptions in the method examples. The details are not described herein again.

In another possible implementation, the communication apparatus may be an authentication, authorization, and accounting function network element, and the communication apparatus may include a transceiver module and a processing module. These modules may perform corresponding functions of the authentication, authorization, and accounting function network element in the foregoing method examples. For details, refer to the detailed descriptions in the method examples. The details are not described herein again.

In still another possible implementation, the communication apparatus may be an authentication anchor, and the communication apparatus may include a transceiver module and a processing module. These modules may perform corresponding functions of the authentication anchor in the foregoing method examples. For details, refer to the detailed descriptions in the method examples. The details are not described herein again.

According to a sixth aspect, this application provides a communication system. The communication system includes an authentication anchor and an authentication, authorization, and accounting function network element. The authentication, authorization, and accounting function network element is configured to: receive access information of a first network from a communication apparatus through the authentication anchor, and trigger mutual temporary authentication with the communication apparatus based on the access information of the first network. The authentication anchor is configured to: when the mutual temporary authentication succeeds, trigger a data management network element to send network selection subscription information of the first network to the communication apparatus.

In a possible implementation, the system further includes the data management network element. The authentication anchor is specifically configured to send a subscription request indication to the data management network element when the mutual temporary authentication succeeds, where the subscription request indication indicates the data management network element to send the network selection subscription information to the communication apparatus. The data management network element is configured to: receive the subscription request indication from the authentication anchor, and send the network selection subscription information to the communication apparatus based on the subscription request indication.

In a possible implementation, the network selection subscription information includes one or more of an identifier of the first network, an archive address of a long-term authentication credential, a service parameter of the communication apparatus, or long-term identification information of the communication apparatus.

In a possible implementation, the access information of the first network includes a type of the access information of the first network, and the type of the access information of the first network indicates that the access information of the first network is used for temporary authentication.

The authentication, authorization, and accounting function network element is further configured to determine, based on the access information type in the access information of the first network, that the mutual temporary authentication with the communication apparatus needs to be triggered.

In a possible implementation, the mutual temporary authentication includes 5G AKA or EAP-AKA'.

In a possible implementation, the authentication, authorization, and accounting function network element is specifically configured to: determine second temporary authentication information based on the access information of the first network, obtain a first temporary symmetric key based on the second temporary authentication information, separately generate a first message authentication code and a first challenge value based on the first temporary symmetric key, and send the first message authentication code and the first challenge value to the authentication anchor.

In a possible implementation, the second temporary authentication information further includes a temporary algorithm. The authentication, authorization, and accounting function network element is further configured to generate the first temporary symmetric key according to the temporary algorithm in the second temporary authentication information.

In a possible implementation, the temporary algorithm includes a key agreement algorithm and a temporary authentication algorithm. The authentication, authorization, and accounting function network element is specifically configured to: generate a second public key and a second private key of the authentication, authorization, and accounting function network element according to the key agreement algorithm, and generate the first temporary symmetric key based on the temporary authentication algorithm, the second private key, and a first public key.

In a possible implementation, the authentication, authorization, and accounting function network element is further configured to send the second public key to the authentication anchor.

According to a seventh aspect, this application provides a computer-readable storage medium. The computer-readable storage medium stores a computer program or instructions. When the computer program or the instructions is/are executed by a communication apparatus, the communication apparatus is enabled to perform the method according to any one of the first aspect or the possible implementations of the first aspect, the method according to any one of the second aspect or the possible implementations of the second aspect, or the method according to any one of the third aspect or the possible implementations of the third aspect.

According to an eighth aspect, this application provides a computer program product. The computer program product includes a computer program or instructions. When the computer program or the instructions is/are executed by a communication apparatus, the method according to any one of the first aspect or the possible implementations of the first aspect, the method according to any one of the second aspect or the possible implementations of the second aspect, or the method according to any one of the third aspect or the possible implementations of the third aspect is implemented.

DETAILED DESCRIPTION OF ILLUSTRATIVE EMBODIMENTS

The following describes in detail embodiments of this application with reference to accompanying drawings.

Figure 1:
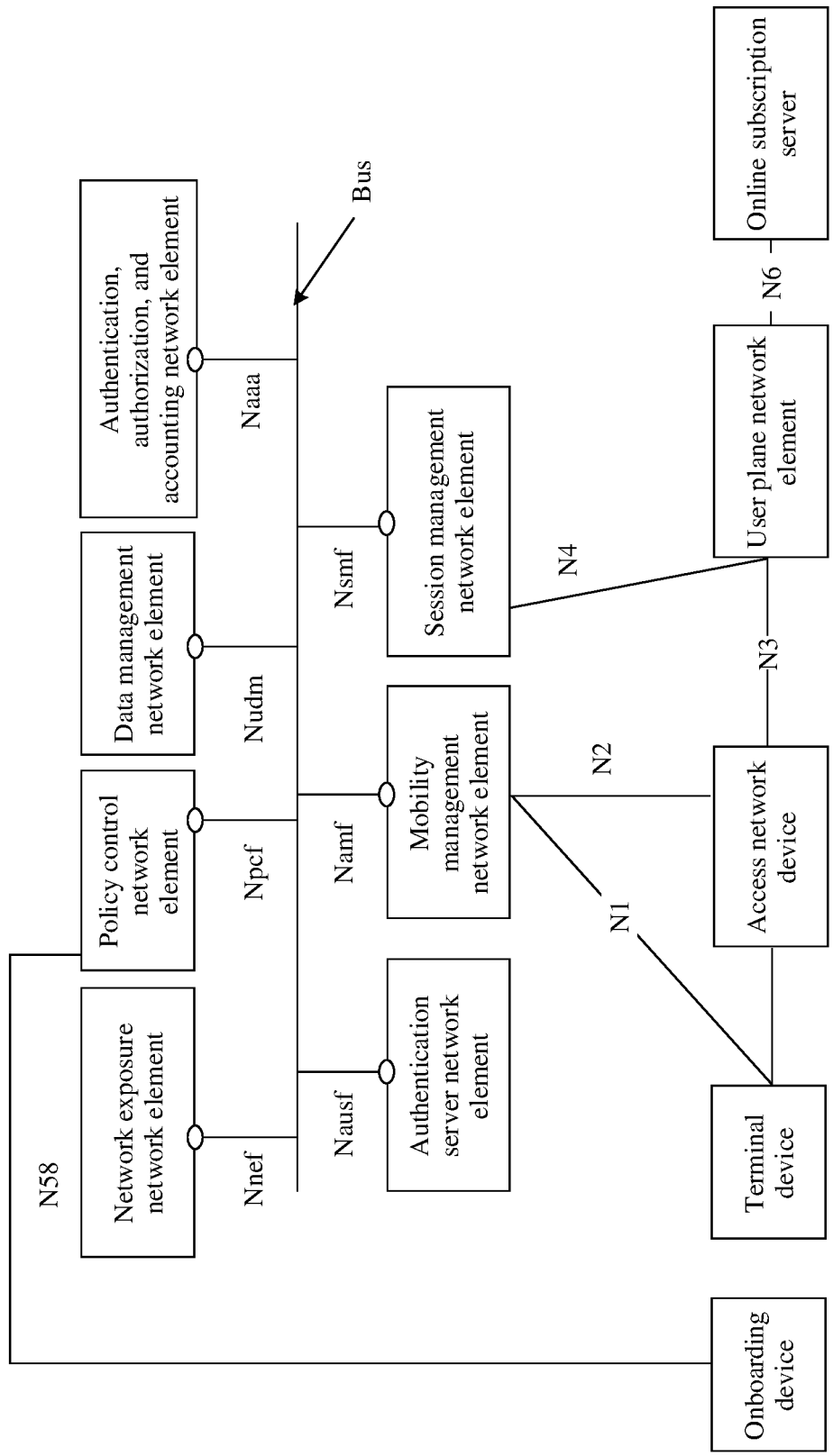
FIG. 1 is a schematic diagram of an architecture of a communication system according to an embodiment of this application.

FIG. 1 is a schematic diagram of an architecture of a communication system to which this application is applicable. As shown in FIG. 1, the communication system may include a network exposure network element, a policy control network element, a data management network element, an authentication, authorization, and accounting function network element, a security anchor network element, a mobility management function network element, a session management network element, an authentication server network element, an online subscription server, a user plane network element, an access network device, a terminal device, and an onboarding device. The network exposure network element, the policy control network element, the data management network element, the authentication, authorization, and accounting function network element, the authentication server network element, the mobility management function network element, and the session management network element may be connected through a bus. The bus herein can implement connection and communication between the network elements in the communication system logically. The connection and communication between the network elements in the communication system may be implemented through an interface or a network. The session management network element is connected to the user plane network element. The session management network element may be configured to control the user plane network element to execute a user plane-related policy, or the session management network element may be configured to control, through the mobility management network element, the terminal device or a radio access network (RAN) to execute a session-related policy.

The data management network element is mainly configured to manage and store user data such as subscription information and authentication/authorization information. In the 5th generation (5G), the data management network element may be a unified data management (UDM) network element or a unified data repository (UDR) network element. In future communication such as the 6th generation (6G), the data management network element may still be a UDM network element or a UDR network element, or have another name. This is not limited in this application.

The authentication, authorization, and accounting function network element is mainly configured to perform temporary authentication on an accessing terminal device, and may be a function of the UDM, or may be an independent network element. In 5G, the authentication, authorization, and accounting function network element may be an authentication, authorization, and accounting (AAA) server. In future communication such as 6G, the authentication, authorization, and accounting function network element may still be an AAA server, or have another name. This is not limited in this application.

The policy control network element is mainly used for user subscription data management, charging policy control, quality of service (QoS) control, and the like. In 5G, the policy control network element may be a policy control function (PCF) network element. In future communication such as 6G, the policy control network element may still be a PCF network element, or have another name. This is not limited in this application.

The network exposure network element is mainly configured to provide an application programming interface (API) that is exposed by an operator network to the outside. To be specific, an external server may invoke the API to interact with the operator network. For example, the PS may invoke the API exposed by the network exposure network element, to configure onboarding information of a terminal device on an authentication, authorization, and accounting function network element. In 5G, the network exposure network element may be a network exposure function (NEF) network element. In future communication such as 6G, the network exposure network element may still be a NEF network element, or have another name. This is not limited in this application.

The session management network element is mainly used for session management in a mobile network and selection and control of a user plane network element. The session management is, for example, session creation, modification, and release. Specific functions include, for example, assigning an Internet protocol (IP) address to a user, and selecting the user plane network element that provides a packet forwarding function. In 5G, the session management network element may be a session management function (SMF) network element. In future communication such as 6G, the session management network element may still be an SMF network element, or have another name. This is not limited in this application.

The mobility management network element is mainly used for registration, mobility management, and a tracking area update procedure for a terminal device in a mobile network. The mobility management network element terminates a non-access stratum (NAS) message, completes registration management, connection management, reachability management, tracking area list (TA list) allocation, mobility management, and the like, and transparently routes a session management (SM) message to the session management network element. In 5G communication, the mobility management network element may be an access and mobility management function (AMF) network element. In future communication such as 6G, the mobility management network element may still be an AMF network element, or have another name. This is not limited in this application.

The authentication server network element is mainly configured to provide an extensible authentication protocol (EAP) authentication service function, and store a key, to implement authentication on a user. In 5G, the authentication server network element may be an authentication server function (AUSF) network element. In future communication such as 6G, the authentication server network element may still be an AUSF network element, or have another name. This is not limited in this application.

The security anchor network element is mainly configured to perform authentication on the terminal device, and may be a function of the AMF. In 5G, the security anchor network element may be a security anchor function (SEAF) network element. In future communication such as 6G, the security anchor network element may still be a SEAF network element, or have another name. This is not limited in this application.

The user plane network element is mainly used for user plane service processing, for example, data packet routing and transmission, packet detection, service usage reporting, quality of service (QoS) processing, lawful interception, uplink packet detection, and downlink data packet storage. In 5G, the user plane network element may be a user plane function (UPF) network element. In future communication such as 6G, the user plane network element may still be a UPF network element, or have another name. This is not limited in this application.

The online subscription server (provisioning server, PS) is mainly configured to provide the terminal device with an authentication credential for network access. The PS may be one or more servers that provide an online subscription service in a data network (DN).

The access network device (also referred to as a radio access network (RAN) device) is a device that provides a wireless communication function for the terminal. The access network device includes but is not limited to: a next generation NodeB (gNodeB, gNB) in 5G, an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a transmission reception point (TRP), a transmission point (TP), a mobile switching center, and the like.

The terminal device (which may also be referred to as user equipment (UE)) is a device having a wireless transceiver function, and may be deployed on land, for example, including an indoor or outdoor device, a handheld device, or a vehicle-mounted device, may be deployed on water (for example, on a ship), or may be deployed in the air (for example, on an airplane, a balloon, and a satellite). The terminal may be a mobile phone, a tablet computer (pad), a computer having a wireless transceiver function, a virtual reality (VR) terminal, an augmented reality (AR) terminal, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. The terminal device may have a display screen, or may not have a display screen.

The onboarding device is mainly configured to obtain temporary authentication information (for example, second temporary authentication information) of the terminal device, and may directly or indirectly invoke an N58 interface. In this application, it is considered by default that the onboarding device has accessed a network through a PLMN or wireless fidelity (Wi-Fi) or in a wired manner or the like, and may access the network exposure network element by invoking the N58 interface, to invoke the API of the network exposure network element.

It should be noted that in the foregoing network elements, all the session management network element, the mobility management network element, the authentication server network element, and the security anchor network element may be authentication anchors. In addition, forms and quantities of the network elements shown in FIG. 1 are merely used as an example, and do not constitute a limitation on this application.

Before a method in this application is described, an application scenario in this application is first further described based on the foregoing content, to help understand this solution. This part of content may alternatively be used as a part of optional content in summary of this application. It should be noted that the system architecture and the application scenario described in this application are intended to describe the technical solutions in this application more clearly, but are not intended to limit the technical solutions provided in this application. A person of ordinary skill in the art may know that as the system architecture evolves and a new scenario emerges, the technical solutions provided in this application are also applicable to a similar technical problem.

No network-side information is configured on UE that was newly delivered, and no information about the UE that was newly delivered is configured on a network side. In a PLMN, a user usually needs to go to a mobile service center for onboarding of the UE that was newly delivered, and only UE on which onboarding has been performed can access the PLMN. This manner requires manual intervention, is not automatic enough, and is inefficient.

In view of this problem, this application provides a communication method. The method may be applied to the communication system shown in FIG. 1. A terminal apparatus in the method may be a terminal device or a module, for example, a chip, that can be used in the terminal device. For ease of description, this application is described below by using an example in which a data management network element is a UDM network element, an authentication, authorization, and accounting function network element is an AAA, a network exposure network element is a NEF network element, a session management network element is an SMF network element, a mobility management network element is an AMF network element, an authentication server network element is an AUSF network element, a security anchor network element is a SEAF network element, a user plane network element is a UPF network element, the terminal device is UE, and an access network device is a base station. Further, the UDM network element is a UDM for short, the authentication, authorization, and accounting function network element is an AAA for short, the PCF network element is a PCF for short, the NEF network element is a NEF for short, the SMF network element is an SMF for short, the AMF network element is an AMF for short, the UPF network element is a UPF for short, and the terminal device is UE for short. In other words, in the following descriptions of this application, all UDMs may be replaced with data management network elements, all AAAs may be replaced with authentication, authorization, and accounting function network elements, all NEFs may be replaced with network exposure network elements, all SMFs may be replaced with session management network elements, all AMFs may be replaced with mobility management network elements, all UPFs may be replaced with user plane network elements, all UE may be replaced with terminal devices, and all base stations may be replaced with access network devices.

With reference to FIG. 1 to FIG. 9, the following describes in detail the communication method provided in this application that is used to resolve the foregoing technical problem.

Before a method procedure is described, first temporary authentication information preconfigured on the UE and second temporary authentication information preconfigured on the AAA are first described separately.

1. The UE preconfigures the first temporary authentication information.

The first temporary authentication information is used by the UE to perform a temporary authentication procedure with a network (for example, a first network in the following method). In other words, the first temporary authentication information is used by a network side to perform temporary authentication on the UE.

In a possible implementation, the first temporary authentication information may include an identifier of a first temporary authentication credential and the first temporary authentication credential. The first temporary authentication credential may be a symmetric key, or may be an asymmetric key (for example, a private key). The identifier of the first temporary authentication credential is used by the network to obtain a second temporary authentication credential based on the identifier of the first temporary authentication credential. The identifier of the first temporary authentication credential may be, for example, an identifier of the UE. The identifier of the UE is, for example, a PEI, an IMEI, or a temporary identifier (ID). For another example, the identifier of the first temporary authentication credential may alternatively be a confusion value of an identifier of the UE, for example, a confusion value of a PEI or a confusion value of an IMEI. The confusion value of the identifier of the UE may be obtained by the UE by performing a hash operation on the identifier of the UE. For another example, the identifier of the first temporary authentication credential may alternatively be a key identifier, for example, a keyless signature infrastructure (keyless signature infrastructure, KSI). When the identifier of the first temporary authentication credential is the confusion value of the identifier of the UE, privacy of the UE can be protected.

2. The AAA preconfigures the second temporary authentication information.

The second temporary authentication information is used by the network (for example, the first network in the following method) to perform the temporary authentication procedure with the UE. In other words, the second temporary authentication information is used by the UE to perform temporary authentication on the network.

With reference to FIG. 1, the second temporary authentication information preconfigured by the AAA may be sent by the onboarding device to the AAA. For example, the onboarding device may obtain the second temporary authentication information in the following two manners. Manner 1: A user enters the second temporary authentication information into the onboarding device. Manner 2: The onboarding device scans a QR code pasted on the UE, where the QR code includes the second temporary authentication information. After obtaining the second temporary authentication information, the onboarding device may access the NEF by invoking the N58 interface, and then invoke an API of the NEF to send the obtained second temporary authentication information to the AAA by using an application-layer message. Correspondingly, the second temporary authentication information is preconfigured on the AAA. It should be understood that second temporary authentication information of a plurality of UEs may be preconfigured on the AAA.

In a possible implementation, the second temporary authentication information includes an identifier of the second temporary authentication credential and the second temporary authentication credential. The second temporary authentication information may be the same as or different from the first temporary authentication information. The following provides detailed descriptions in cases.

Case 1: The second temporary authentication information is the same as the first temporary authentication information.

In a possible implementation, the first temporary authentication information may include the identifier of the UE and a first temporary symmetric key. To be specific, the identifier of the first temporary authentication credential is the identifier of the UE, and the first temporary authentication credential is the first temporary symmetric key. The second temporary authentication information may include the identifier of the UE and a second temporary symmetric key. To be specific, the identifier of the second temporary authentication credential is the identifier of the UE, and the second temporary authentication credential is the second temporary symmetric key. The first temporary symmetric key and the second temporary symmetric key are symmetric keys. This may also be understood as: The first temporary authentication credential and the second temporary authentication credential are symmetric keys, and both the identifier of the first temporary authentication credential and the identifier of the second temporary authentication credential are the identifier of the UE.

Case 2: The second temporary authentication information is different from the first temporary authentication information.

In a possible implementation, the first temporary authentication information may include the identifier of the UE and a first private key of the UE, where the first private key is PrUE for short below. To be specific, the identifier of the first temporary authentication credential is the identifier of the UE, and the first temporary authentication credential is the first private key PrUE of the UE. The second temporary authentication information includes the confusion value of the identifier of the UE and a first public key of the UE, where the first public key is a public key PkUE for short below. To be specific, the identifier of the second temporary authentication credential is the confusion value of the identifier of the UE, and the second temporary authentication credential is the first public key PkUE of the UE. The first private key of the UE and the first public key of the UE are a pair of asymmetric keys. In other words, the first temporary authentication credential is the first private key PrUE of the UE, the second temporary authentication credential is the first public key PkUE of the UE, the identifier of the first temporary authentication credential is the identifier of the UE, and the identifier of the second temporary authentication credential is the confusion value of the identifier of the UE.

In another possible implementation, the first temporary authentication information includes an identifier of a verification parameter, a first certificate (the first certificate includes an identifier of the first certificate and a signature of the first certificate), and a private key PrUE of the first certificate. To be specific, the identifier of the first temporary authentication credential is the identifier of the verification parameter, and the first temporary authentication credential is the first certificate and the private key PrUE of the first certificate. The second temporary authentication information includes the identifier of the verification parameter and the verification parameter. The verification parameter is used to verify validity of the first certificate, and may be a public key of a third party. The identifier of the verification parameter is used to determine the verification parameter, and may be the same as the identifier of the first certificate. The identifier of the first certificate includes an identifier of the user, a key identifier, or the like. Particularly, because the certificate is used in a 3GPP network, the identifier of the first certificate may include information about the UE, for example, the PEI or the IMEI, and the signature of the first certificate may be obtained by the third party by signing the first certificate by using a private key of the third party.

In still another possible implementation, the first temporary authentication information includes an identifier of a verification parameter, the verification parameter, a first certificate, and a private key PrUE of the first certificate. To be specific, the identifier of the first temporary authentication credential is the identifier of the verification parameter, and the first temporary authentication credential is the first certificate and the private key PrUE of the first certificate. The second temporary authentication information includes the identifier of the verification parameter, the verification parameter, a second certificate, and a private key PrAAA of the second certificate, and the second temporary authentication credential includes the verification parameter, the second certificate (the second certificate includes an identifier of the second certificate and a signature of the second certificate), and the private key PrAAA of the second certificate. For related descriptions of the identifier of the verification parameter and the verification parameter, refer to the foregoing descriptions. The signature of the second certificate may be obtained by a third party by signing the second certificate by using a private key of the third party.

Further, the second temporary authentication information may further include a temporary algorithm, and the temporary algorithm indicates an algorithm required when the first network and the UE perform the temporary authentication procedure. The temporary algorithm includes a temporary authentication algorithm and/or a key agreement algorithm. The temporary authentication algorithm includes 5G authentication and key agreement (AKA), extensible authentication protocol (EAP) AKA', or EAP transport layer security (TLS). The key agreement algorithm includes a Diffie-Hellman (DH) algorithm, an elliptic curve Diffie-Hellman algorithm, or the like. The second temporary authentication information includes the temporary algorithm, so that the AAA can perform the corresponding temporary authentication procedure according to the included temporary algorithm. In this way, the temporary algorithm can be used to obtain configuration information by a plurality of UEs that support different authentication algorithms, where the configuration information is used by the UE to select and access a network.

Figure 2:
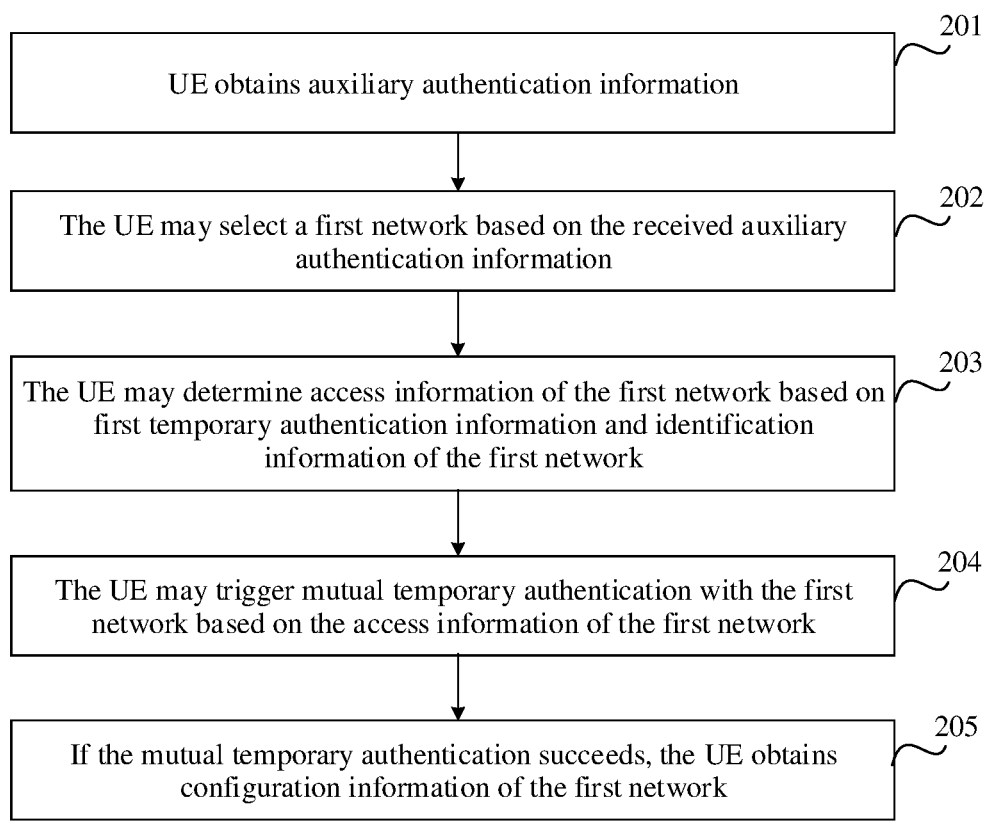
FIG. 2 is a schematic flowchart of a communication method according to an embodiment of this application.

Based on the foregoing content, FIG. 2 is a schematic flowchart of a communication method according to this application. The method includes the following steps.

Step 201: UE obtains auxiliary authentication information.

In a possible implementation, an access network device (for example, a base station) may broadcast the auxiliary authentication information. Correspondingly, the UE obtains the auxiliary authentication information broadcast by the base station. When onboarding has not been performed on the terminal apparatus, the terminal apparatus has no configuration information locally, and cannot select and access a network based on the configuration information. Therefore, when the terminal apparatus has no subscription information, the broadcast auxiliary authentication information can help the terminal apparatus obtain a parameter required for network access, so that the terminal apparatus can attempt to access the network.

The auxiliary authentication information may include identification information of one or more networks, and the identification information of the network is used to address the network. The identification information of the network may be, for example, a public land mobile network identifier (PLMN ID), a network identifier (NID), or a network name.

Further, the auxiliary authentication information may further include onboarding indication information, where the onboarding indication information indicates that a network supports an onboarding procedure.

Herein, the auxiliary authentication information is used to assist the UE in temporarily selecting a network (referred to as a first network), and performing a mutual temporary authentication procedure with the selected network. It should be understood that the base station may simultaneously broadcast a plurality of pieces of auxiliary authentication information, and each piece of auxiliary authentication information includes identification information of a network. For example, one broadcast corresponds to one piece of auxiliary authentication information, and the UE may obtain a plurality of pieces of auxiliary authentication information by receiving a plurality of broadcasts. For another example, one broadcast corresponds to a plurality of pieces of auxiliary authentication information, and the UE may obtain a plurality of pieces of auxiliary authentication information by receiving one broadcast.

Step 202: The UE may choose, based on the received auxiliary authentication information, to access the first network.

Step 202 is an optional step.

Herein, the first network is any one of the one or more networks. Within a same time period, the UE may select one network as the first network from the identification information of the network included in each of the obtained plurality of pieces of auxiliary authentication information. Further, the first network selected by the UE supports the onboarding procedure.

The following provides examples of two manners in which the UE chooses to access the first network: a manual manner and an automatic manner.

In the manual manner, the UE displays, on a display screen, the identification information of all the networks that is obtained based on the auxiliary authentication information, and a user may select one network as the first network from the identification information of all the networks that is displayed on the UE. Further, if the auxiliary authentication information further includes the onboarding indication information, the UE may display, on the display screen, identification information of only one or more networks that support the onboarding procedure.

In the automatic manner, the UE may select one network as the first network based on the obtained identification information of all the networks and signal strength, a preset sequence, or the like. Further, if the auxiliary authentication information further includes a private network identifier (for example, the NID), the UE may select, based on the signal strength, the preset sequence, or the like, one network as the first network from networks corresponding to private network identifiers. A reason why the UE chooses, based only on the auxiliary authentication information including the private network identifier, to access the first network is that only a private network supports the onboarding procedure, and the UE can avoid selecting a public network that does not support the onboarding procedure, to improve onboarding efficiency.

Further, if the auxiliary authentication information further includes the onboarding indication information, the UE may select, based on the signal strength, the preset sequence, or the like, one network as the first network from the networks that support the onboarding procedure. The UE chooses, based only on the auxiliary authentication information including the onboarding indication information, to access the first network, to avoid selecting a network that does not support the onboarding procedure. This improves the onboarding efficiency.

In a possible implementation, after choosing to access the first network, the UE may obtain identification information of the first network. The identification information of the first network includes a PLMN ID and/or an NID.

Step 203: The UE may determine access information of the first network based on first temporary authentication information and the identification information of the first network.

Herein, the access information of the first network is used by the first network to determine second temporary authentication information.

In a possible implementation, the UE may determine the access information of the first network based on the first temporary authentication information. Based on this implementation, the access information of the first network may include an identifier of a third temporary authentication credential, and the identifier of the third temporary authentication credential is used by an AAA to determine a second temporary authentication credential, so that the AAA can determine the second temporary authentication information. The identifier of the third temporary authentication credential may be determined by the UE based on an identifier of a first temporary authentication credential. For example, the identifier of the first temporary authentication credential is an identifier of the UE, and the identifier of the third temporary authentication credential may be a confusion value of the identifier of the UE, and specifically, may be a confusion value that is of the identifier of the UE and that is obtained by the UE by performing a hash operation on the identifier of the UE. For another example, the identifier of the first temporary authentication credential is an identifier of the UE, and the identifier of the third temporary authentication credential may be the identifier of the UE. For another example, if the identifier of the first temporary authentication credential is an identifier of a verification parameter, the identifier of the third temporary authentication credential may also be the identifier of the verification parameter. Further, the UE may determine the access information of the first network based on the first temporary authentication information and the auxiliary authentication information. Based on this implementation, the access information of the first network may include the identifier of the third temporary authentication credential and identification information of the AAA. The identification information of the AAA is used to address the AAA. The identification information of the AAA may be, for example, a routing indicator (RI), an Internet protocol (Internet protocol, IP) address of the AAA, or a default value (for example, all "1"). Specifically, the UE may determine the identifier of the third temporary authentication credential based on the identifier of the first temporary authentication credential, and the UE may determine the identification information of the AAA based on the obtained auxiliary authentication information. The identification information of the AAA may be carried in the auxiliary authentication information in step 201. In this case, the UE may directly obtain the identification information of the AAA from the auxiliary authentication information. Alternatively, the auxiliary authentication information includes only the identification information of the network, and the UE may send the identification information of the first network to the first network, to request to obtain the identification information of the AAA.

In another possible implementation, the UE may determine the access information of the first network based on the first temporary authentication information and the auxiliary authentication information. To be specific, the UE may determine an identifier of a third temporary authentication credential based on an identifier of a first temporary authentication credential, and determine the identification information of the first network and identification information of an AAA based on the obtained auxiliary authentication information. If the identification information of the first network is carried in the auxiliary authentication information in step 201, the UE may directly obtain the identification information of the first network from the auxiliary authentication information. The identification information of the AAA in the first network may be carried in the auxiliary authentication information in step 201. In this case, the UE may directly obtain the identification information of the AAA from the auxiliary authentication information. Alternatively, the auxiliary authentication information includes only the identification information of the first network, and the UE may send the identification information of the first network to the first network, to request to obtain the identification information of the AAA. Based on this implementation, the access information of the first network may include the identifier of the third temporary authentication credential, the identification information of the first network, and the identification information of the AAA.

In another possible implementation, the UE may determine the access information of the first network based on the first temporary authentication information and a default value corresponding to identification information of an AAA. The default value corresponding to the identification information of the AAA may be generated by the UE in a preset manner. Specifically, the UE may determine an identifier of a third temporary authentication credential based on an identifier of a first temporary authentication credential. Refer to the foregoing descriptions. The identification information of the AAA may be determined based on the default value. Based on this implementation, the access information of the first network may include the identifier of the third temporary authentication credential and the identification information of the AAA.

Further, optionally, the access information of the first network may further include a type of the access information of the first network. The type of the access information of the first network may be a specific type. The type of the access information of the first network is used to assist the AAA in determining the second temporary authentication information, and may indicate that the access information of the first network is used for temporary authentication, indicate that the access information of the first network is preconfigured by a manufacturer, or indicate that the access information of the first network is not owned by the current network. The type of the access information of the first network includes, for example, a subscription permanent identifier (SUPI) type. The SUPI type may be a non-zero value (for an IMSI) or a non-one value (for a NAI), and is any value ranging from 2 to 7.

It should be understood that the access information of the first network may include any one of the following: the identifier of the third temporary authentication credential; the identifier of the third temporary authentication credential and the identification information of the first network; the identifier of the third temporary authentication credential and the type of the access information of the first network; the identifier of the third temporary authentication credential and the identification information of the AAA; the identifier of the third temporary authentication credential, the identification information of the first network, and the type of the access information of the first network; the identifier of the third temporary authentication credential, the identification information of the first network, and the identification information of the AAA; the identifier of the third temporary authentication credential, the type of the access information of the first network, and the identification information of the AAA; the identifier of the third temporary authentication credential, the identification information of the first network, the identification information of the AAA, and the type of the access information of the first network; the identifier of the third temporary authentication credential and the default value; the identifier of the third temporary authentication credential, the identification information of the first network, and the default value; the identifier of the third temporary authentication credential, the type of the access information of the first network, and the identification information of the AAA; or the identifier of the third temporary authentication credential, the identification information of the first network, the default value, and the type of the access information of the first network.

In this application, the access information of the first network may be a subscription concealed identifier (SUCI). For construction of the SUCI, refer to 3GPP TS 23.003. The SUCI includes the following parameters: the SUPI type, a home network identifier, the routing indicator, a protection scheme identifier, a home network public key identifier, and/or a scheme output. For example, the SUPI type may be set to a non-zero or non-one value, the home network identifier may be set to the PLMN ID of the first network, the routing indicator may be set to the RI of the first network, the protection scheme identifier and the home network public key identifier may be set to 0, and the scheme output may be set to the identifier of the third temporary authentication credential.

Step 204: The UE may trigger mutual temporary authentication with the first network based on the access information of the first network.

In a possible implementation, the UE may send the access information of the first network to the AAA in the first network. Correspondingly, the AAA receives the access information of the first network from the UE.

Herein, the UE may first send the access information of the first network to an authentication anchor, and then the authentication anchor sends the access information of the first network to the AAA.

In a possible implementation, the access information of the first network may be further used by the authentication anchor in the first network to select the AAA. Refer to the following descriptions in FIG. 3.

With reference to FIG. 1, the authentication anchor may be the AMF, the SEAF, the SMF, or the AUSF, and the authentication anchor may learn of a temporary authentication result obtained after the UE performs the authentication procedure with the first network.

Further, the AAA may determine the second temporary authentication information based on the access information of the first network.

Based on different access information of the first network in step 203, the following separately describes a process in which the AAA determines the second temporary authentication information based on the access information of the first network.

The access information of the first network includes the identifier of the third temporary authentication credential, and the AAA may obtain the second temporary authentication credential information based on the identifier of the third temporary authentication credential. Further, a temporary algorithm corresponding to the identifier of the third temporary authentication credential may be obtained.

If the access information of the first network further includes the type of the access information, and the type of the access information is the specific type, and may indicate that the access information of the first network is used for the temporary authentication, indicate that the access information of the first network is preconfigured by the manufacturer, or indicate that the access information of the first network is not owned by the current network, the AAA may determine, based on the specific type, that temporary authentication information needs to be searched for. Because the identifier of the third temporary authentication credential is preconfigured by the manufacturer of the UE, the identifier may be duplicate with a SUPI (allocated by the first network) that has been stored in the first network, and introducing the specific type of the access information can avoid a problem that an incorrect ID is found due to duplicate user identities.

In a possible implementation, the access information of the first network includes the identifier of the third temporary authentication credential (for example, the confusion value of the identifier of the UE), and the AAA may search, based on the identifier of the third temporary authentication credential, a plurality of pieces of stored second temporary authentication information for an identifier of the second temporary authentication credential that is the same as the identifier of the third temporary authentication credential, to obtain the second temporary authentication credential information.

In another possible implementation, the access information of the first network includes the identification information (for example, the RI) of the AAA and the identifier of the third temporary authentication credential (for example, the confusion value of the identifier of the UE). The authentication anchor may determine the AAA based on the identification information of the AAA, and then send the access information of the first network to the determined AAA. The AAA may search, based on the confusion value of the identifier of the UE, a plurality of pieces of stored second temporary authentication information for a confusion value of the identifier of the UE that is the same as the confusion value of the identifier of the UE, to obtain the second temporary authentication information of the UE. In other words, the AAA may determine the second temporary authentication information based on the identifier of the third temporary authentication credential. The AAA may obtain, from the second temporary authentication information, the second temporary authentication credential corresponding to the confusion value of the identifier of the UE. Further, a temporary algorithm corresponding to the confusion value of the identifier of the UE may be obtained.

In still another possible implementation, the access information of the first network includes the identification information (for example, the RI) of the AAA and the identifier of the third temporary authentication credential (for example, the identifier of the verification parameter). The authentication anchor may determine the AAA based on the identification information of the AAA, and then send the access information of the first network to the determined AAA. The AAA may search, based on the identifier of the verification parameter, a plurality of pieces of stored second temporary authentication information for an identifier of a verification parameter that is the same as the identifier of the verification parameter, to obtain the second temporary authentication information of the UE. The AAA may obtain the verification parameter corresponding to the identifier of the verification parameter from the second temporary authentication information. Further, a second certificate corresponding to the identifier of the verification parameter and a private key PrAAA of the second certificate may be obtained. Further, a temporary algorithm corresponding to the identifier of the verification parameter may be obtained.

In still another possible implementation, the access information of the first network includes the identification information (for example, the default value) of the AAA and the identifier of the third temporary authentication credential (for example, the confusion value of the identifier of the UE). A local configuration of the authentication anchor may include the default value of the AAA. The authentication anchor may determine the AAA based on the local configuration. To be specific, the local configuration of the authentication anchor includes the AAA corresponding to the default value, and then the access information of the first network is sent to the determined AAA. The AAA may search, based on the confusion value of the identifier of the UE, a plurality of pieces of stored second temporary authentication information for a confusion value of the identifier of the UE that is the same as the confusion value of the identifier of the UE, to obtain the second temporary authentication information of the UE. In other words, the AAA may determine the second temporary authentication information based on the identifier of the third temporary authentication credential. The AAA may obtain, from the second temporary authentication information, the second temporary authentication credential corresponding to the confusion value of the identifier of the UE. Further, a temporary algorithm corresponding to the confusion value of the identifier of the UE may be obtained.

In still another possible implementation, the access information of the first network includes the identification information (for example, the RI) of the AAA, the identifier of the third temporary authentication credential (for example, the confusion value of the identifier of the UE), and the type (for example, the SUPI type) of the access information of the first network. The authentication anchor may determine the AAA based on the identification information of the AAA, and then send the access information of the first network to the determined AAA. The AAA may determine, based on the type of the access information of the first network, that the temporary authentication information needs to be searched for, and then search a plurality of pieces of stored second temporary authentication information for a confusion value of the identifier of the UE that is the same as the confusion value of the identifier of the UE, to obtain the second temporary authentication information of the UE. In other words, the AAA may determine the second temporary authentication information based on the identifier of the third temporary authentication credential. In this way, the AAA may obtain, from the second temporary authentication information, the second temporary authentication credential corresponding to the confusion value of the identifier of the UE. Further, a temporary algorithm corresponding to the confusion value of the identifier of the UE may be obtained.

In this application, the UE and the AAA may perform mutual temporary authentication based on the first temporary authentication information and the second temporary authentication information respectively.

In a possible implementation, the mutual temporary authentication procedure may be performed between the UE and the AAA through 5G AKA, EAP-AKA', or EAP TLS. A specific temporary authentication procedure to be used may be determined by the AAA according to the temporary algorithm included in the second temporary authentication information, may be negotiated in advance by the UE and the first network, or may be predefined in a protocol. This is not limited in this application.

Step 205: If the mutual temporary authentication succeeds, the UE obtains configuration information of the first network.

This step is an optional step.

Herein, the configuration information of the first network is used by the terminal apparatus to select and access the first network. In a possible implementation, the configuration information of the first network includes network selection subscription information and/or a long-term authentication credential. The network selection subscription information is used by the UE to choose to access the first network. In other words, the UE may choose, by using the network selection subscription information of the first network, to access the first network. For example, after the UE obtains the configuration information of the first network, the UE may select the first network with a highest priority in sequence (for example, in a priority sequence), and initiate a registration request to the first network. In a process in which the UE registers with the first network, the first network initiates authentication. The long-term authentication credential may be a credential used by the first network to authorize the terminal apparatus to access the first network, so that the terminal apparatus accesses the first network and obtains a service provided by the first network.

In a possible implementation, the network selection subscription information may include the identification information (for example, the PLMN ID or the NID) of the first network, the routing indicator (routing indicator, RI), a service parameter (for example, a QoS parameter) of the terminal, slice information (for example, NSSAI) of the first network, a data network name (for example, a DNN) of the first network, and long-term identification information (for example, the SUPI) of the UE. The SUPI is not used temporarily. For a definition of the RI, refer to 3GPP TS 23.003.

In a possible implementation, the long-term authentication credential may be the credential indicating used by the first network to authorize the terminal apparatus to access the first network. Further, optionally, after accessing the first network based on the long-term authentication credential, the terminal apparatus may obtain the service provided by the first network. For example, the first network may generate a pair of public and private keys, and send the public key (namely, the long-term authentication credential) in the pair to the terminal apparatus. The terminal apparatus may perform authentication with the first network based on the received public key (namely, the long-term authentication credential), to access the first network. For another example, the first network sends a symmetric key (namely, the long-term authentication credential) to the terminal apparatus, and the terminal apparatus may perform authentication with the first network based on the symmetric key (namely, the long-term authentication credential), to access the first network. In other words, the long-term authentication credential may be a public key or a certificate, or may be a symmetric key received by the terminal apparatus the same as that in the first network.

For example, the network selection subscription information obtained by the UE includes the PLMN ID, the NID, the RI, and the SUPI, and the long-term authentication credential obtained by the UE is a certificate. After the UE obtains the network selection subscription information and the long-term authentication credential, the UE may select, based on the PLMN ID and the NID, the first network with the same PLMN ID and NID from the broadcast of the base station. The UE constructs the SUCI based on the PLMN ID, the RI, and the SUPI to attempt to access the first network, and performs authentication with the first network by using the certificate, to obtain the service of the first network.

Based on the foregoing solution, the UE may determine the access information of the first network based on the obtained auxiliary authentication information and the first temporary authentication information, to trigger the mutual temporary authentication with the first network based on the access information of the first network. When the mutual temporary authentication between the UE and the first network succeeds, the UE may obtain, from the first network, the configuration information for accessing the first network, so that the UE can access the first network based on the configuration information. In this way, the UE can securely obtain subscription information of the first network when no network-side information is configured on the UE.

Figure 3:
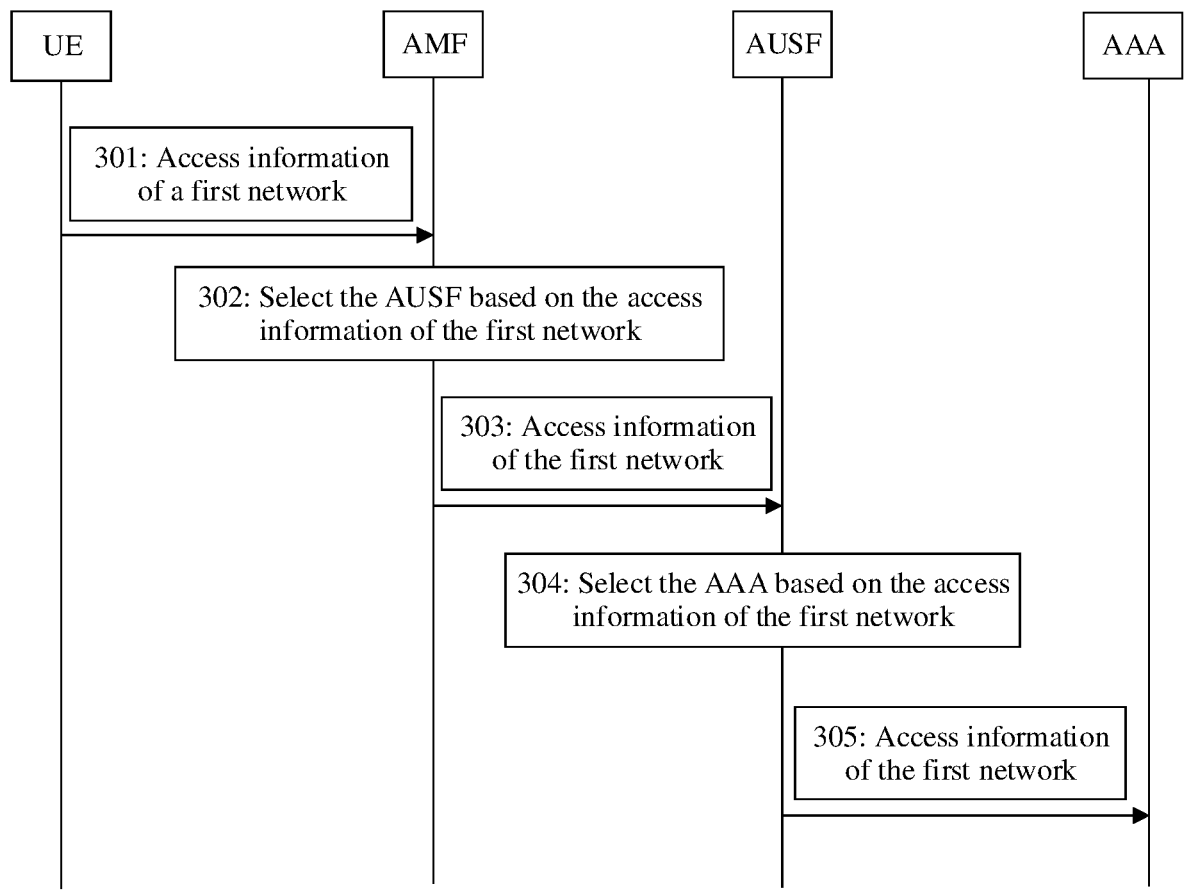
FIG. 3 is a schematic flowchart of a method for sending access information of a first network to an AAA by UE according to an embodiment of this application.

For step 204, FIG. 3 is a schematic flowchart of a method for sending the access information of the first network to the AAA by the UE according to this application. The method may include the following steps.

Step 301: The UE sends the access information of the first network to the AMF.

The access information of the first network may be carried in a registration request message. To be specific, the UE may send the registration request message to the AMF, and the registration request message includes the access information of the first network. For a possible implementation of the access information of the first network, refer to the related descriptions in step 203. Details are not described herein again.

Step 302: The AMF may select the AUSF based on the access information of the first network.

Herein, if the access information of the first network includes the identification information (for example, the RI) of the AAA, the AMF may select the AUSF based on the identification information (for example, the RI) of the AAA. If the access information of the first network further includes the identification information (the PLMN ID) of the first network, the AMF may select the AUSF based on the identification information (the PLMN ID) of the network and the identification information (for example, the RI) of the AAA. If the access information of the first network includes the SUPI type, and the SUPI type is a non-0 or non-1 value, and may indicate that the access information of the first network is used for the temporary authentication, or indicate that the access information of the first network is preconfigured by the manufacturer or not owned by the current network or that the RI is a default value, the AMF may select the specific AUSF from a local configuration. In other words, identification information of the specific AUSF is locally configured on the AMF; and if the access information of the first network includes the identification information of the specific AUSF or indicates the specific SUPI type, the AMF may determine the AUSF from the local configuration. The specific AUSF is specially configured to perform the temporary authentication procedure.

Step 303: The AMF sends the access information of the first network to the determined AUSF.

Step 304: The AUSF selects the AAA based on the access information of the first network.

In a possible implementation, the access information of the first network may include the identification information of the AAA, and the AUSF may directly determine the AAA based on the identification information of the AAA. If the access information of the first network further includes the identification information (the PLMN ID) of the network, the AUSF may select the AAA based on the identification information (the PLMN ID) of the network and the identification information (for example, the RI) of the AAA. For example, the AUSF may directly select the AAA based on the RI in the access information of the first network. In another possible implementation, if the access information of the first network includes the SUPI type, and the SUPI type is a non-0 or non-1 value, and may indicate that the access information of the first network is used for the temporary authentication, or indicate that the access information of the first network is preconfigured by the manufacturer or not owned by the current network or that the RI is a default value, the AUSF may determine the AAA in a local configuration. In other words, the identification information of the specific AAA is locally configured on the AUSF; and if the access information of the first network includes the identification information (namely, the default value) of the specific AAA or indicates the specific SUPI type, the AUSF may determine the AAA in the local configuration.

Further, the local configuration of the AUSF may further include a mapping relationship between the identification information of the network and the identification information of the AAA. If the access information of the first network includes only the identification information of the network, the AUSF may obtain the identification information of the AAA based on the identification information of the network.

Step 305: The AUSF sends the access information of the first network to the AAA. Correspondingly, the AAA receives the access information of the first network from the AUSF.

The following provides three possible examples of performing mutual temporary authentication between the UE and the first network. It should be noted that the mutual temporary authentication procedure performed between the UE and the first network includes but is not limited to the following three examples, and the following three examples are merely examples for description.

Example 1: The first temporary authentication credential preconfigured on the UE is a first private key PrUE of the UE, and the second temporary authentication credential preconfigured on the AAA is a first public key PkUE of the UE.

Figure 4A:
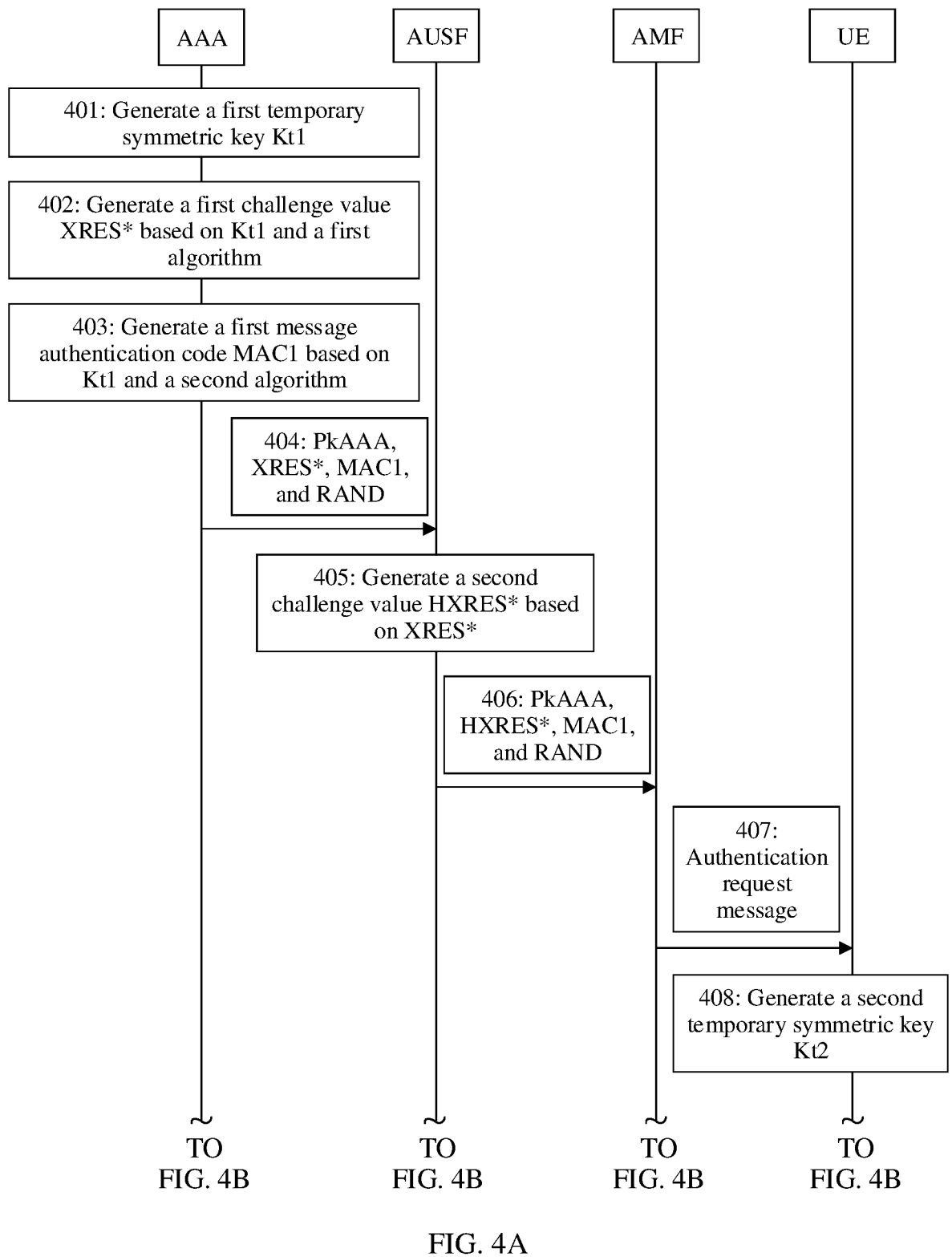
FIG. 4A and FIG. 4B are a schematic flowchart of a method for performing mutual temporary authentication between UE and a first network according to an embodiment of this application.
Figure 4B:
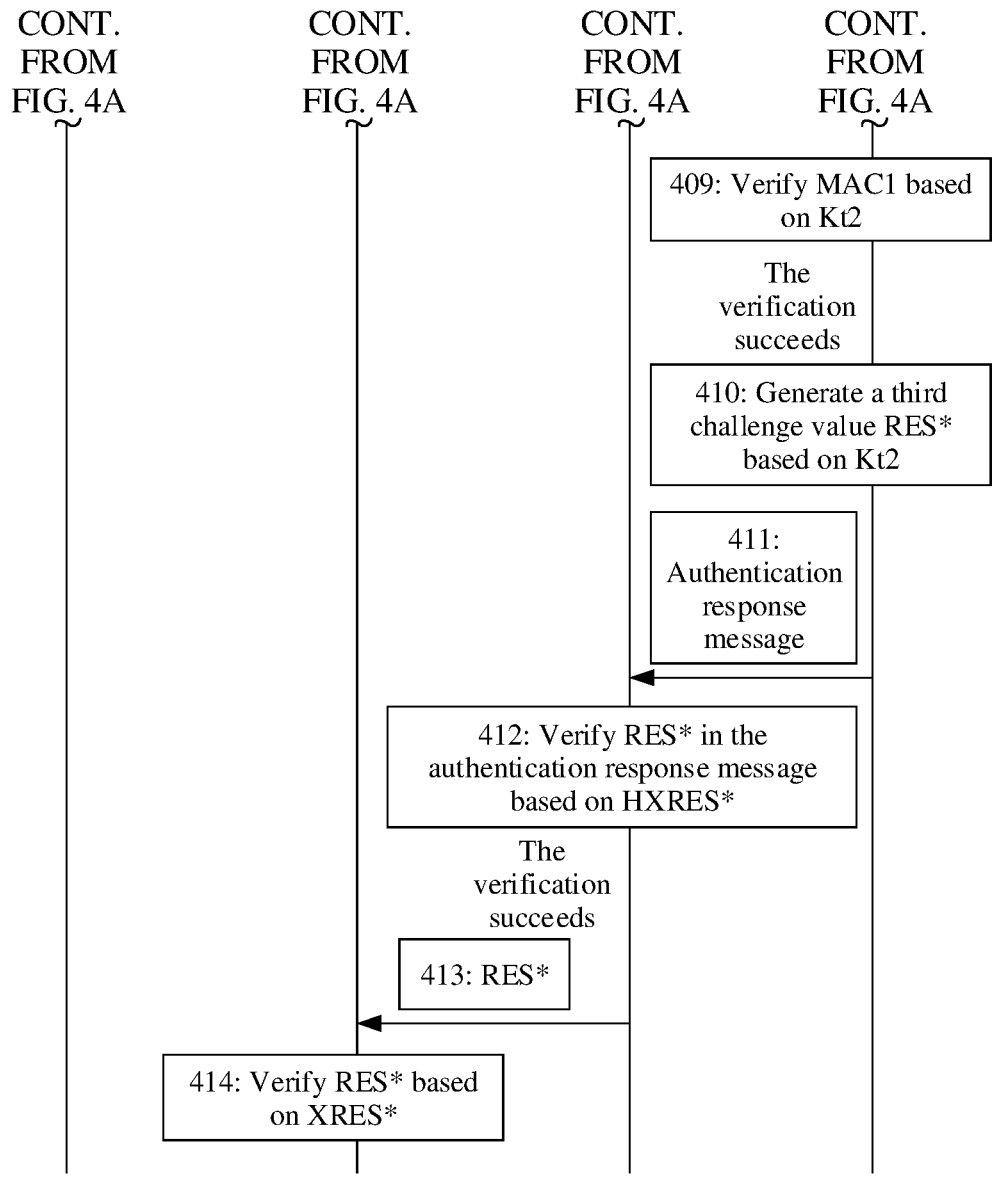

Based on the example 1, FIG. 4A and FIG. 4B are a schematic flowchart of a method for performing mutual temporary authentication between the UE and the first network according to this application. The method may include the following steps.

Step 401: The AAA generates a first temporary symmetric key Kt1.

Herein, the AAA generates a pair of asymmetric keys, namely, a second public key PkAAA and a second private key PrAAA.

In a possible implementation, the second temporary authentication information may include the temporary algorithm, and the AAA may generate Kt1 according to the temporary algorithm in the second temporary authentication information. Further, the temporary algorithm may include a key agreement algorithm. For example, the AAA may generate PkAAA and PrAAA according to the key agreement algorithm, and then generate Kt1 based on the second private key PrAAA and the second temporary authentication credential (namely, the public key PkUE).

Step 402: The AAA may generate a first challenge value XRES* based on Kt1 and a first algorithm.

Herein, XRES* is used by the AUSF to perform authentication on the UE.

In a possible implementation, the temporary algorithm may include a first temporary authentication algorithm. To be specific, the AAA may generate XRES* based on the first temporary authentication algorithm (namely, the first algorithm) in the second temporary authentication information and Kt1. Further, if the first temporary authentication algorithm is the 5G AKA, specifically, the AAA may generate a random number RAND, then generate XRES based on Kt1, RAND, and an f2 algorithm (namely, the first algorithm), and generate XRES* based on XRES and RAND.

Step 403: The AAA may generate a first message authentication code MAC1 based on Kt1 and a second algorithm.

Herein, MAC1 is used by the UE to perform authentication on the first network.

In a possible implementation, the temporary algorithm may include a second temporary authentication algorithm. For example, the AAA may generate MAC1 based on the second temporary authentication algorithm (namely, the second algorithm) in the second temporary authentication information and Kt1. Further, if the temporary authentication algorithm is the 5G AKA or the EAP-AKA', specifically, the AAA may generate a random number RAND, and then generate MAC1 based on Kt1, RAND, and an f1 algorithm (namely, the second algorithm).

It should be noted that there is no sequence between step 402 and step 403. Step 402 may be performed before step 403, step 403 may be performed before step 402, or step 402 and step 403 may be simultaneously performed. This is not limited in this application.

Step 404: The AAA sends PkAAA, XRES*, MAC1, and RAND to the AUSF. Correspondingly, the AUSF receives PkAAA, XRES*, MAC1, and RAND from the AAA.

Step 405: The AUSF generates a second challenge value HXRES* based on XRES*.

In a possible implementation, the AUSF may generate HXRES* based on XRES* and RAND. HXRES* is used by the AMF to perform authentication on the UE.

XRES* is used by the AUSF to perform authentication on the UE. Therefore, the AUSF needs to store XRES*.

Step 406: The AUSF sends PkAAA, HXRES*, MAC1, and RAND to the AMF. Correspondingly, the AMF receives PkAAA, HXRES*, MAC1, and RAND from the AUSF.

HXRES* is used by the AMF to perform authentication on the UE. Therefore, the AMF needs to store HXRES*.

Step 407: The AMF sends an authentication request message to the UE. Correspondingly, the UE receives the authentication request message from the AMF.

The authentication request message includes PkAAA, MAC1, and RAND.

Step 408: The UE generates a second temporary symmetric key Kt2.

Herein, after receiving the authentication request message that includes PkAAA, the UE may generate Kt2 based on the second public key PkAAA and the first temporary authentication credential (namely, the private key PrUE) in the first temporary authentication information.

It should be understood that the UE generates Kt2 by using the second public key PkAAA and the private key PrUE, the AAA generates Kt1 by using the second private key PrAAA and the public key PkUE, and Kt1 and Kt2 are the same. The UE and the AAA negotiate the same temporary symmetric key by using the key agreement algorithm (namely, a public/private key mechanism), and then perform mutual temporary authentication based on the same temporary symmetric key. In this way, an existing procedure may be used as much as possible, to reduce modifications to the existing authentication procedure.

Step 409: The UE verifies MAC1 based on Kt2.

In a possible implementation, the UE generates XMAC1 based on Kt2, RAND, and the second temporary authentication algorithm (the f1 algorithm). If it is determined that received MAC1 is the same as XMAC1, it indicates that the UE successfully verifies MAC1. That is, the temporary authentication performed by the UE on the first network succeeds. Then, step 410 is performed. It should be noted that, received MAC1 is generated by the AAA based on Kt1, RAND, and the f1 algorithm.

Step 410: The UE may generate a third challenge value RES* based on Kt2.

Herein, RES* is used by the first network to perform authentication on the UE. Specifically, the UE may generate RES based on Kt2, RAND, and the f2 algorithm, and then generate RES* based on RES and RAND.

Step 411: The UE sends an authentication response message to the AMF. Correspondingly, the AMF receives the authentication response message from the UE.

The authentication response message includes the third challenge value RES*.

Step 412: The AMF may verify the third challenge value RES* in the authentication response message based on HXRES*.

In step 406, the AMF stores HXRES*, and the AMF may generate HRES* based on RES* and RAND. If the AMF determines that HXRES* is the same as generated HRES*, the AMF successfully verifies RES*. This indicates that the temporary authentication performed by the AMF on the UE succeeds, and then step 413 is performed.

Step 413: If the verification succeeds, the AMF sends RES* to the AUSF.

Step 414: The AUSF verifies RES* based on XRES*.

Herein, the AUSF compares RES* and XRES*. If RES* and XRES* are the same, the verification on RES* succeeds. This indicates that the AUSF authenticates the UE. It should be noted that RES* is generated by the UE based on RES and RAND, where RES may be generated by the UE based on Kt2, RAND, and the f2 algorithm; XRES* is generated by the AAA based on XRES and RAND, where XRES is generated by the AAA based on Kt1, RAND, and the f2 algorithm. RES* and XRES* are the same only when the AAA obtains correct PkUE and the UE and AAA respectively generate, through negotiation, Kt1 and Kt2 that are the same.

It can be learned from the example 1 that both the AMF and the AUSF participate in the mutual temporary authentication procedure performed between the UE and the AAA, and both can obtain an authentication success result. Therefore, the authentication anchor in the example 1 may be the AMF or the AUSF. In addition, the UE and the first network perform symmetric key negotiation based on an existing 5G AKA authentication method by using the public/private key mechanism, so that the symmetric key can be reused to implement the 5G AKA, to reduce system complexity. Further, because the public/private key mechanism is used, and the public key is open, even if the public key is pasted in a QR code form on the terminal device and is exposed, security of the temporary authentication procedure performed between the UE and the first network is not affected.

Example 2: The first temporary authentication credential preconfigured on the UE is a first private key PrUE of the UE, and the second temporary authentication credential preconfigured on the AAA is a first public key PkUE of the UE.

Figure 5:
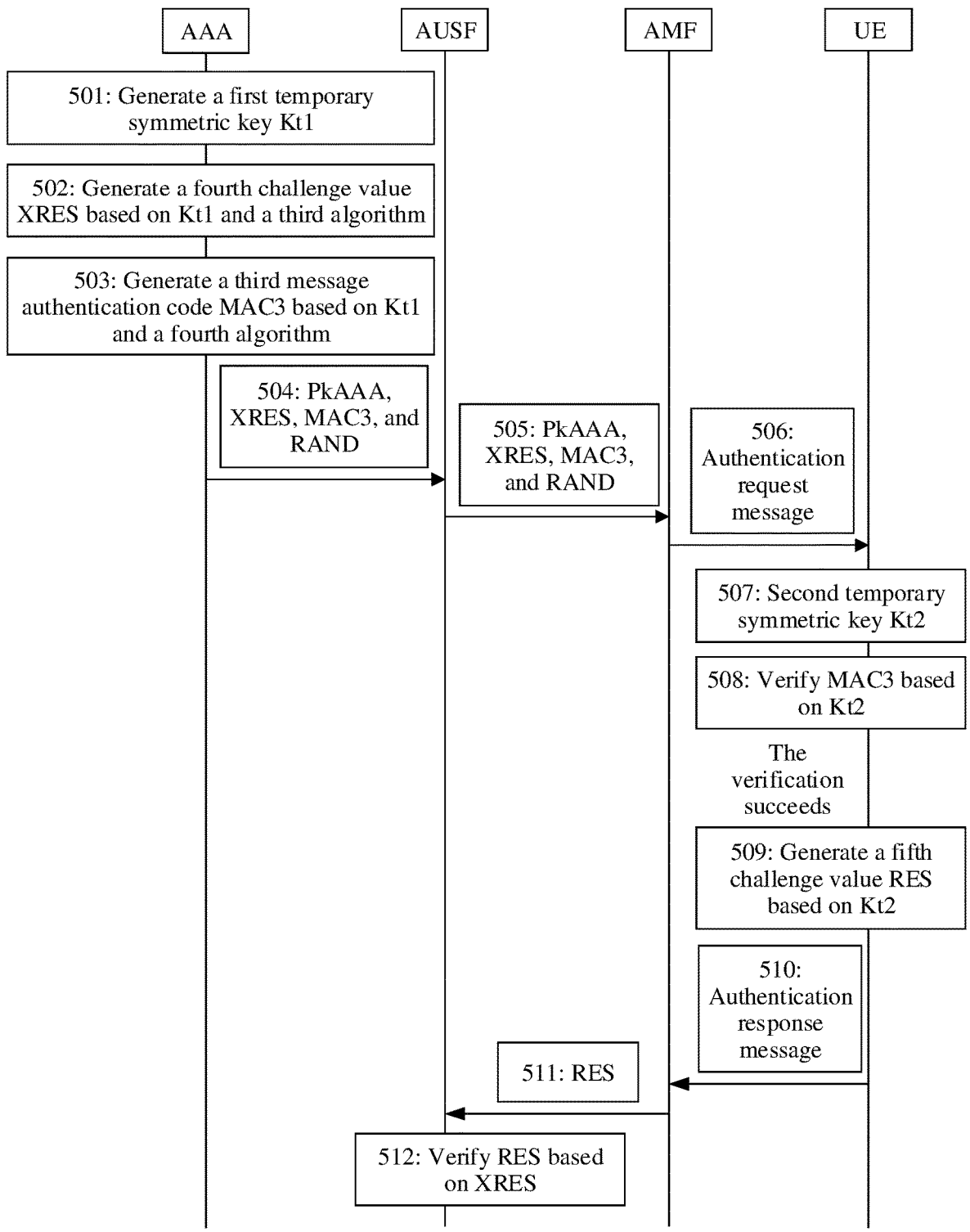
FIG. 5 is another schematic flowchart of a method for performing mutual temporary authentication between UE and a first network according to an embodiment of this application.

Based on the example 2, FIG. 5 is a schematic flowchart of a method for performing mutual temporary authentication between the UE and the first network according to this application. The method may include the following steps.

Step 501: The AAA generates a first temporary symmetric key Kt1.

For step 501, refer to the descriptions of step 401. Details are not described herein again.

Step 502: The AAA may generate a fourth challenge value XRES based on Kt1 and a third algorithm.

Herein, XRES is used by the AUSF to perform authentication on the UE.

In a possible implementation, the temporary algorithm may include a third temporary authentication algorithm. For example, the AAA may generate XRES based on the third temporary authentication algorithm in the second temporary authentication information and Kt1. Further, if the third temporary authentication algorithm is the EAP-AKA', the AAA may generate a random number RAND, and then generate XRES based on Kt1, RAND, and an f2 algorithm (namely, the third algorithm).

Step 503: The AAA generates a third message authentication code MAC3 based on Kt1 and a fourth algorithm.

In a possible implementation, the temporary algorithm may include a fourth temporary authentication algorithm. For example, the AAA may generate MAC3 based on the fourth temporary authentication algorithm (namely, the fourth algorithm) in the second temporary authentication information and Kt1. Further, if the temporary authentication algorithm is the EAP-AKA', specifically, the AAA may generate a random number RAND, and then generate MAC3 based on Kt1, RAND, and an f1 algorithm (namely, the fourth algorithm).

For step 503, refer to the descriptions of step 403. Details are not described herein again.

It should be noted that there is no sequence between step 502 and step 503. Step 502 may be performed before step 503, step 503 may be performed before step 502, or step 502 and step 503 may be simultaneously performed. This is not limited in this application.

Step 504: The AAA sends PkAAA, XRES, MAC1, and RAND to the AUSF. Correspondingly, the AUSF receives PkAAA, XRES, MAC1, and RAND from the AAA.

For step 504, refer to the descriptions of step 404. Details are not described herein again.

Step 505: The AUSF sends PkAAA, XRES, MAC1, and RAND to the AMF. Correspondingly, the AMF receives PkAAA, XRES, MAC1, and RAND from the AUSF.

XRES is used by the AMF to perform authentication on the UE. Therefore, the AMF needs to store XRES.

Step 506: The AMF sends an authentication request message to the UE. Correspondingly, the UE receives the authentication request message from the AMF.

For step 506, refer to the descriptions of step 407. Details are not described herein again.

Step 507: The UE generates a second temporary symmetric key Kt2.

For step 507, refer to the descriptions of step 408. Details are not described herein again.

Step 508: The UE verifies MAC3 based on Kt2.

For step 508, refer to the descriptions of step 409. Details are not described herein again.

Step 509: The UE generates a fifth challenge value RES based on Kt2.

Herein, RES is used by the first network to perform authentication on the UE. Specifically, the UE may generate RES based on Kt2, RAND, and the f2 algorithm.

Step 510: The UE sends an authentication response message to the AMF. Correspondingly, the AMF receives the authentication response message from the UE.

The authentication response message includes the fifth challenge value RES.

Step 511: The AMF sends RES to the AUSF.

Step 512: The AUSF verifies RES based on XRES.

Herein, the AUSF may compare RES and XRES. If RES and XRES are the same, the verification on RES succeeds. This indicates that the AUSF authenticates the UE. It should be noted that, XRES is generated by the AAA based on Kt1, RAND, and the f2 algorithm, and RES may be generated by the UE based on Kt2, RAND, and the f2 algorithm. It should be understood that RES* and XRES* are the same only when the AAA obtains correct PkUE and the UE and AAA respectively generate, through negotiation, Kt1 and Kt2 that are the same.

It can be learned from the example 2 that the AMF does not directly perform temporary authentication on the UE, and the authentication is performed by the AUSF. Therefore, the authentication anchor in the example 2 is the AUSF. In addition, the UE and the first network perform symmetric key negotiation based on an existing EAP-AKA' authentication method by using a public/private key mechanism, so that the symmetric key can be reused to implement the EAP-AKA', to reduce system complexity. Further, in the example 2, because the public/private key mechanism is used, and the public key is open, even if the public key is pasted in a QR code form on the terminal device and is exposed, security of the temporary authentication procedure performed between the UE and the first network is not affected.

Example 3: The first temporary authentication credential preconfigured on the UE includes a first certificate, a private key PrUE of the first certificate, and the verification parameter, and the second temporary authentication credential preconfigured on the AAA includes the verification parameter, a second certificate, and a second private key PrAAA of the second certificate.

Figure 6:
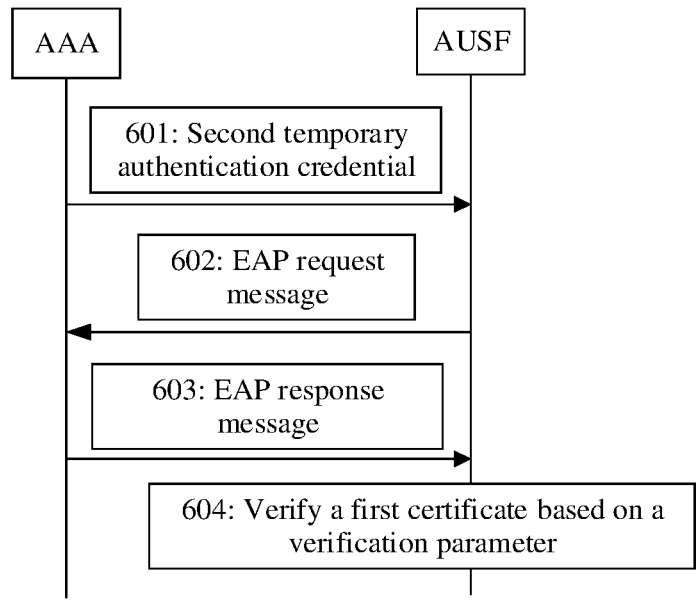
FIG. 6 is still another schematic flowchart of a method for performing mutual temporary authentication between UE and a first network according to an embodiment of this application.

FIG. 6 is still another schematic flowchart of a method for performing mutual temporary authentication between the UE and the first network according to this application. The method may include the following steps.

Step 601: The AAA sends the second temporary authentication credential to the AUSF. Correspondingly, the AUSF receives the second temporary authentication credential from the AAA.

Herein, the second temporary authentication credential includes the verification parameter. Optionally, the second temporary authentication credential further includes the second certificate and the second private key PrAAA of the second certificate. The verification parameter is used to verify a signature of the first certificate, and may be a public key of a trusted third party. The second certificate and the second private key PrAAA of the second certificate are used by the UE to verify the AUSF.

Step 602: The AUSF sends an extensible authentication protocol (EAP) request message to the UE. Correspondingly, the UE receives the EAP request message from the AUSF.

Herein, the EAP request message is used to request the UE to perform an EAP authentication procedure. Optionally, the EAP request message may include the second certificate. The UE verifies the second certificate based on the verification parameter. The verification parameter is obtained by the UE from the first temporary authentication information.

Optionally, the EAP request message may further include MAC1, and MAC1 is generated by the AUSF based on the second private key PrAAA of the second certificate. The UE verifies MAC1 based on a public key in the second certificate. If the verification succeeds, it indicates that the UE authenticates the AUSF.

Step 603: The UE sends an EAP response message to the AUSF.

Herein, the EAP response message includes the first certificate and MAC2. MAC2 is generated by the UE based on the private key PrUE of the first certificate. PrUE is obtained by the UE from the first temporary authentication information.

Step 604: The AUSF verifies the first certificate based on the verification parameter.

In a possible implementation, the AUSF verifies the first certificate based on the verification parameter and the identifier of the verification parameter. For example, the AUSF verifies the signature of the first certificate based on the public key of the third party. Further, the AUSF verifies MAC2 based on the public key of the first certificate. Optionally, the AUSF compares whether the identifier of the verification parameter is the same as a received identifier of the first certificate. If the two identifiers are the same, it indicates that the verification on the first certificate succeeds. The AUSF may obtain the identifier of the first certificate from the access information of the first network, or may obtain the identifier of the first certificate from the AAA. If the verification succeeds, it indicates that the AUSF authenticates the UE.

It can be learned from the example 3 that the AMF does not directly perform temporary authentication on the UE, and the authentication is performed by the AUSF. Therefore, the authentication anchor in the example 3 is the AUSF. Subsequently, the AUSF and the UE continue to perform an EAP-TLS procedure. For the authentication procedure, refer to TS 33.601 B.2.1.1. Details are not described herein again. In this way, the UE and the first network extend an existing EAP TLS authentication method by using a certificate mechanism, so that the existing EAP TLS authentication method can be reused, to reduce system complexity.

In this application, if the mutual temporary authentication succeeds, the UE may obtain the configuration information of the first network. The following provides descriptions by using an example in which the configuration information of the first network includes the network selection subscription information and the long-term authentication credential.

After determining that the mutual temporary authentication between the first network and the UE succeeds, the authentication anchor may trigger a data management network element to send the network selection subscription information of the first network to the terminal apparatus. After the mutual temporary authentication is completed, the authentication anchor may send a subscription request indication to the UDM, to trigger the UDM to send the network selection subscription information for the UE to the terminal apparatus. The following provides examples of three implementations in which the UE obtains the network selection subscription information.

Implementation 1: The network selection subscription information that the UE needs to obtain is preconfigured on the UDM. For example, an administrator may preconfigure network selection subscription information that is for each UE, for example, network selection subscription information in the UE device, on the UDM.

Figure 7:
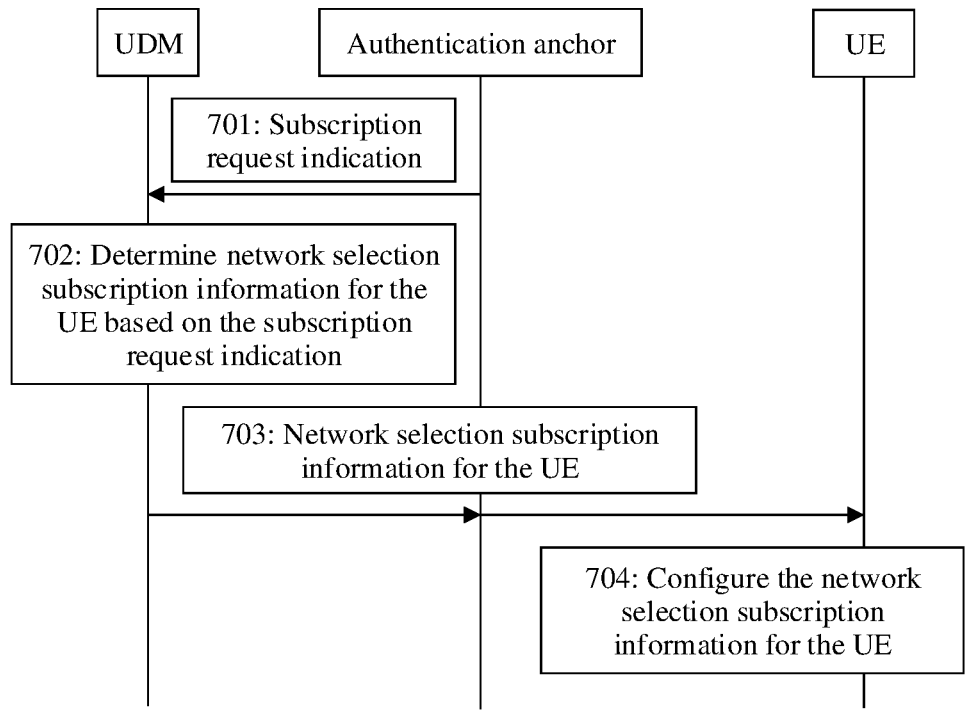
FIG. 7 is a schematic flowchart of a method for obtaining network selection subscription information according to an embodiment of this application.

FIG. 7 is a schematic flowchart of a method for obtaining the network selection subscription information according to this application. The method includes the following steps.

Step 701: The authentication anchor sends the subscription request indication to the UDM. Correspondingly, the UDM receives the subscription request indication from the authentication anchor.

Particularly, after the temporary authentication succeeds, the authentication anchor sends the subscription request indication to the UDM.

The authentication anchor may be the AMF or the AUSF, and the subscription request indication indicates the UDM to send the network selection subscription information of the first network to the UE. This may also be understood as: The AMF or the AUSF sends a subscription request message to the UDM.

In a possible implementation, the authentication anchor further sends the identifier of the second temporary authentication credential of the UE or the identifier of the third temporary authentication credential of the UE to the UDM. The identifier of the third temporary authentication credential of the UE is obtained from the UE, and the identifier of the second temporary authentication credential of the UE is obtained from the AAA.

Optionally, the subscription request indication may be a special indication, or may be a message, for example, the subscription request message. The subscription request message indicates the UDM to send the network selection subscription information of the first network to the UE.

Step 702: The UDM determines the network selection subscription information for the UE based on the subscription request indication.

In a possible implementation, the UDM determines the network selection subscription information for the UE based on the subscription request indication. For example, the UDM searches for preconfigured network selection subscription information based on the subscription request indication. In this case, network selection subscription information for different UEs may be the same.

In a possible implementation, the UDM determines the network selection subscription information for the UE based on the subscription request indication and the identifier of the second temporary authentication credential of the UE or the identifier of the third temporary authentication credential of the UE.

For example, the UDM searches, based on the subscription request indication and the identifier of the second temporary authentication credential of the UE or the identifier of the third temporary authentication credential of the UE, for the network selection subscription information preconfigured for the UE. The network selection subscription information may be simultaneously preconfigured for the UE when the second temporary authentication information is preconfigured. In this case, network selection subscription information for different UEs may be different.

Step 703: The UDM sends the network selection subscription information for the UE to the UE through the authentication anchor.

In a possible implementation, the UDM sends a subscription data update notification to the AMF. Optionally, the subscription data update notification message includes the network selection subscription information and the identifier of the second temporary authentication credential of the UE, or includes the network selection subscription information and the identifier of the third temporary authentication credential of the UE.

Further, the AMF may send a configuration update message to the UE, where the message includes the network selection subscription information for the UE.

Step 704: The UE configures the network selection subscription information for the UE.

In a possible implementation, the UE receives the configuration update message sent by the AMF, where the message includes the network selection subscription information for the UE, and the UE performs configuration on the UE device based on the network selection subscription information for the UE.

It can be learned from step 701 to step 704 that after the mutual temporary authentication succeeds, the authentication anchor requests the UDM to send the network selection subscription information for the UE, so that the first network can determine that the terminal apparatus that obtains the network selection subscription information is correct, and the terminal apparatus can determine that the first network that sends the network selection subscription information is correct.

Implementation 2: The network selection subscription information that the UE needs to obtain is preconfigured on the UDM. For example, an administrator may preconfigure network selection subscription information that is for each UE, for example, network selection subscription information in a SIM card, on the UDM.

Figure 8:
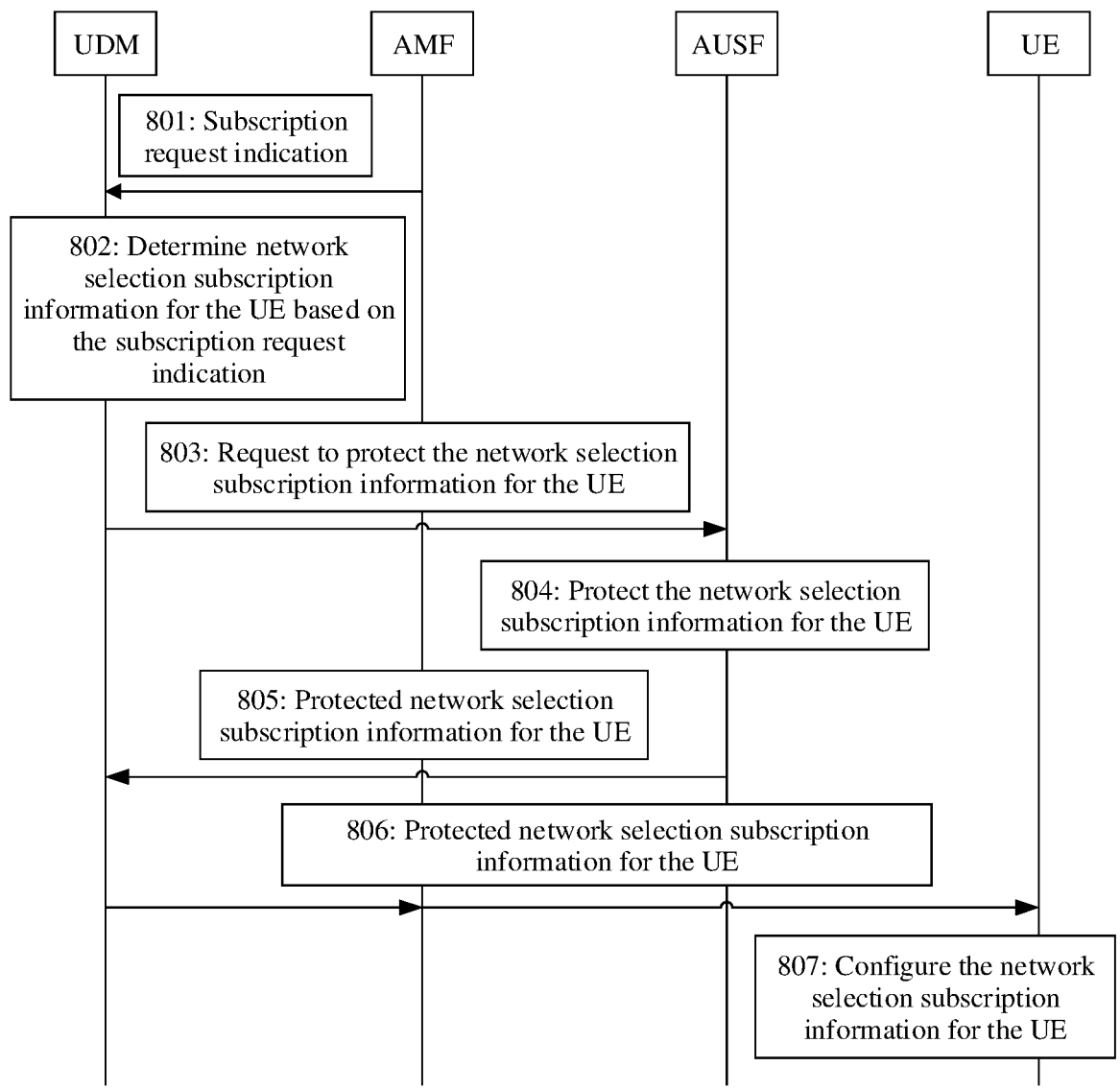
FIG. 8 is another schematic flowchart of a method for obtaining network selection subscription information according to an embodiment of this application.

FIG. 8 is another schematic flowchart of a method for obtaining the network selection subscription information according to this application. The method includes the following steps.

Step 801: The authentication anchor sends the subscription request indication to the UDM. Correspondingly, the UDM receives the subscription request indication from the authentication anchor.

For step 801, refer to the descriptions of step 701. Details are not described herein again.

Step 802: The UDM determines the network selection subscription information for the UE based on the subscription request indication.

For step 802, refer to the descriptions of step 702. Details are not described herein again.

Step 803: The UDM requests the AUSF to protect the network selection subscription information for the UE.

In a possible implementation, the UDM sends an AUSF protection request to the AUSF, where the protection request includes the network selection subscription information for the UE.

Step 804: The AUSF protects the network selection subscription information for the UE.

Herein, the AUSF may perform integrity protection on the network selection subscription information for the UE by using Kausf.

Step 805: The AUSF sends protected network selection subscription information for the UE to the UDM.

Step 806: The UDM sends the protected network selection subscription information for the UE to the UE through the AMF.

In a possible implementation, the AMF sends a downlink NAS transport message to the UE, where the message includes the protected network selection subscription information for the UE.

Step 807: The UE configures the network selection subscription information for the UE based on the protected network selection subscription information for the UE.

Herein, the UE performs integrity verification on the protected network selection subscription information for the UE by using Kausf, and may obtain the network selection subscription information for the UE after the check succeeds.

In a possible implementation, the UE receives the downlink NAS transport message sent by the AMF, where the NAS transport message includes the protected network selection subscription information for the UE. The UE performs integrity check on the protected network selection subscription information for the UE by using Kausf. If the verification succeeds, the network selection subscription information for the UE may be obtained. The UE performs configuration on the SIM card based on the network selection subscription information for the UE.

It can be learned from step 801 to step 807 that after the mutual temporary authentication succeeds, the authentication anchor triggers the UDM to send the network selection subscription information to the UE through a UPU procedure, to prevent the network selection subscription information from being maliciously tampered with.

It should be noted that, alternatively, for step 703 and step 704, refer to related descriptions in 4.2.4 of 3GPP TS 23.502; for step 803 to step 807, refer to descriptions in 4.20 of 3GPP TS 23.502. Details are not described herein again.

Implementation 3: The network selection subscription information that needs to be obtained is preconfigured on the authentication anchor, and the authentication anchor may directly notify the UE to obtain the network selection subscription information.

With reference to the example 1 to the example 3, if the UE and the first network successfully perform mutual temporary authentication by using the example 1, the AMF or the AUSF may send a subscription request message to the UDM. If the UE and the first network successfully perform mutual temporary authentication by using the example 2, the AUSF may directly notify the UDM to send a subscription request message; or the AUSF may first notify the AMF, and then the AMF sends a subscription request message to the UDM. For example, the AUSF sends the subscription request message to the AMF, and then the AMF sends the subscription request message to the UDM.

Based on any one of the foregoing three implementations, after the authentication anchor obtains the result indicating that the mutual temporary authentication between the UE and the first network succeeds, the authentication anchor may obtain the network selection subscription information for the UE by triggering a control plane message (for example, a NAS message). That is, the first network may configure the network selection subscription information for the UE through a control plane path.

Figure 9:
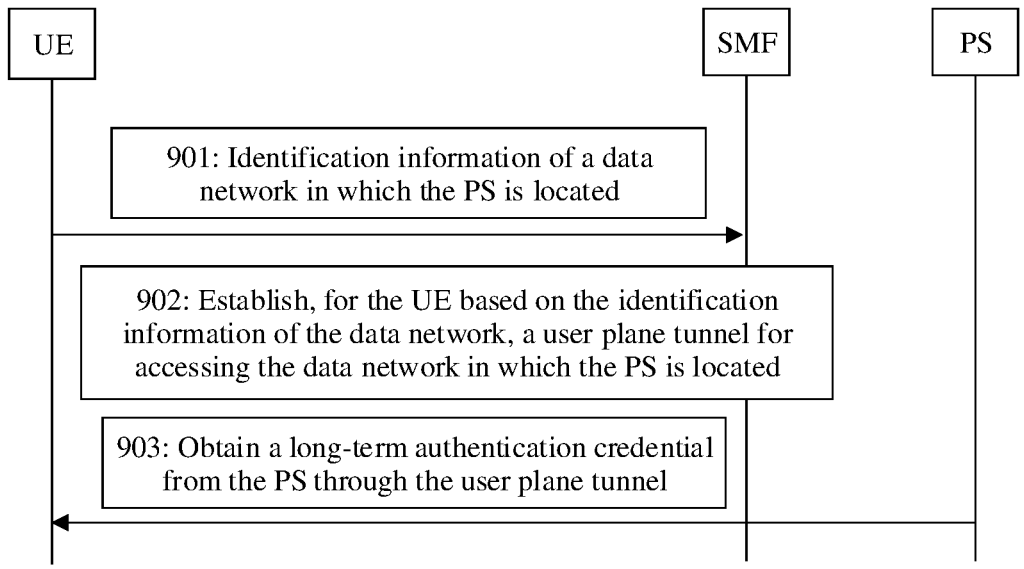
FIG. 9 is a schematic flowchart of a method for obtaining a long-term authentication credential according to an embodiment of this application.

The foregoing describes the implementations in which the UE obtains the network selection subscription information of the first network. The following provides a schematic flowchart of an example of a method for obtaining the long-term authentication credential by the UE. As shown in FIG. 9, the method includes the following steps.

Step 901: The UE sends, to the SMF, identification information of a data network in which a PS is located.

Herein, the identification information of the data network identifies the data network in which the PS is located. The identification information of the data network may be, for example, a data network name (DNN) or single network slice selection assistance information (NSSAI).

In a possible implementation, the UE may send a protocol data unit (protocol data unit, PDU) session establishment message to the SMF, where the PDU session establishment message includes an identifier of the data network in which the PS is located.

The following provides examples of two implementations in which the UE obtains the identification information of the data network.

Implementation 1: The auxiliary authentication information in step 201 may further include the identification information of the data network.

Based on the implementation 1, the UE may obtain the identifier of the data network from the obtained auxiliary authentication information.

Implementation 2: The identification information of the data network may alternatively be a default value.

Based on the implementation 2, the UE may determine the identification information of the data network based on the default value.

Step 902: The SMF establishes, for the UE based on the identification information of the data network, a user plane tunnel for accessing the data network in which the PS is located.

When the identification information of the data network is a default identifier of the data network, the SMF may establish, for the UE, a specific user plane tunnel to the data network based on a local configuration.

Optionally, the SMF may send the identifier of the second temporary authentication credential of the UE or the identifier of the third temporary authentication credential of the UE to the UDM, to request a temporary authentication result for the UE. The SMF may learn, based on the temporary authentication result, whether the UE can be authorized to access the data network. The identifier of the second temporary authentication credential of the UE or the identifier of the third temporary authentication credential of the UE may be obtained from the AMF based on the PDU session establishment message of the UE.

In a possible implementation, after the temporary authentication is completed, the authentication anchor may notify the UDM to generate the temporary authentication result. The temporary authentication result may be a success or failure indication, or may be identifiers of a group of authorizing data networks. When the authentication anchor notifies the UDM that the temporary authentication succeeds, the UDM updates the temporary authentication result corresponding to the identifier of the second temporary authentication credential or the identifier of the third temporary authentication credential of the UE.

In a possible implementation, the SMF sends a PDU session establishment complete message to the UE, to indicate to the UE that session establishment is completed. To be specific, the user plane tunnel for accessing the data network in which the PS is located is established for the UE.

Step 903: The UE obtains the long-term authentication credential from the PS through the user plane tunnel.

Herein, the UE and the PS may obtain the long-term authentication credential by using a protocol, for example, the certificate management protocol (CMP) or the over the air (OTA) protocol.

It can be learned from step 901 to step 903 that the first network may configure the long-term authentication credential for the UE through the user plane path, and the UE and the PS may obtain the long-term authentication credential by using the existing CMP or OTA protocol. In this way, this method may be compatible with the existing PS.

In this application, the mutual temporary authentication between the UE and the first network may alternatively fail. In this case, the first network may send an access reject message to the UE. The following provides examples of two scenarios in which the mutual temporary authentication between the UE and the first network fails.

Scenario 1: In step 205, the AAA cannot obtain the second temporary authentication credential based on the access information of the first network. For example, the AAA does not find, from the stored second temporary authentication information, the identifier of the second temporary authentication credential that is the same as the identifier of the third temporary authentication credential in the access information of the first network. This indicates that the first network does not obtain the second temporary authentication information of the UE, and the first network selected by the UE is incorrect.

Scenario 2: The temporary authentication performed by the first network on the UE fails. A possible cause is that the second temporary authentication information obtained by the AAA is incorrect. For example, in step 412, the verification performed by the AMF on the third challenge value RES* fails. For another example, in step 414, the verification performed by the AUSF on RES* fails. For another example, in step 512, the verification performed by the AUSF on RES fails.

Scenario 3: The temporary authentication performed by the UE on the first network fails. A possible cause is that the second temporary authentication information obtained by the AAA is incorrect. For example, in step 409, the verification performed by the UE on MAC1 fails. For another example, in step 508, the verification performed by the UE on MAC1 fails. For another example, in step 604, the verification performed by the AUSF on the first certificate fails.

After receiving the access reject message from the first network, the UE may perform step 202 again. To be specific, the UE may reselect a new network based on the auxiliary authentication information, where the reselected network is referred to as a second network. In this way, the UE can automatically select a correct network, and obtain configuration information of the correct network, to successfully implement onboarding.

In a possible implementation, the UE may reselect a new network as the first network based on the signal strength, the preset sequence, or the like. Further, optionally, the UE may alternatively perform selection depending on whether the auxiliary authentication information carries a private network identifier. If the auxiliary authentication information does not carry the private network identifier, the network is skipped, and it is determined whether a next network carries a private network identifier. Further, optionally, the UE may alternatively perform selection depending on whether the auxiliary authentication information carries an onboarding indication information. If the auxiliary authentication information does not carry the onboarding indication, the network is skipped, and it is determined whether a next network carries an onboarding indication.

Further, the access reject message may include a cause value for an access failure. For example, the second temporary authentication credential cannot be found, or the authentication on the UE fails. Correspondingly, if the cause value carried in the access reject message is that the second temporary authentication credential cannot be found, the UE may reselect a new network as the second network from the received auxiliary authentication information. If the cause value carried in the access reject message is that the authentication on the UE fails, the UE may reselect a new network as the second network from the received auxiliary authentication information, or the first network and the UE perform a mutual temporary authentication procedure again.

In a possible implementation, when the authentication performed by the UE on the first network fails, the UE may reselect a new network as the second network from the received auxiliary authentication information, or the UE and the first network perform a mutual temporary authentication procedure again.

It may be understood that, to implement the functions in the foregoing embodiments, the authentication, authorization, and accounting function network element, the authentication anchor, and the terminal device include corresponding hardware structures and/or software modules for performing the functions. A person skilled in the art should be easily aware that, in combination with the modules and the method steps in the examples described in embodiments disclosed in this application, this application can be implemented by hardware or a combination of hardware and computer software. Whether a function is performed by hardware or hardware driven by computer software depends on particular application scenarios and design constraints of the technical solutions.

Figure 10:
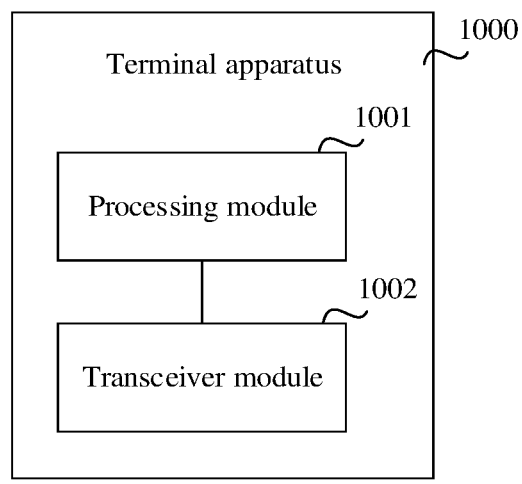
FIG. 10 is a schematic diagram of a structure of a communication apparatus according to an embodiment of this application.
Figure 11:
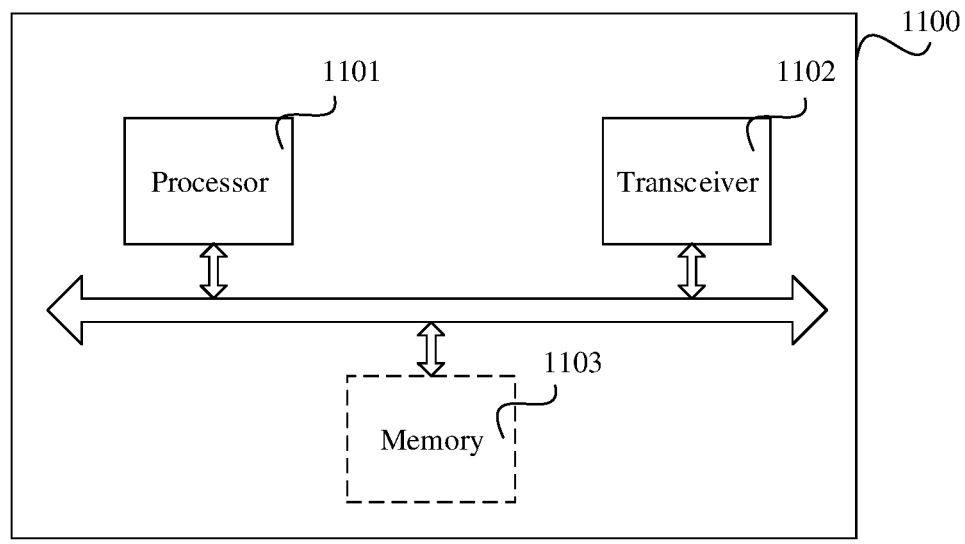
FIG. 11 is a schematic diagram of a structure of a communication apparatus according to an embodiment of this application.

Based on the foregoing content and a same concept, FIG. 10 and FIG. 11 each are a schematic diagram of a possible structure of a communication apparatus according to this application. These communication apparatuses may be configured to implement the functions of the authentication, authorization, and accounting function network element, the authentication anchor, and the terminal device in the foregoing method embodiments, and therefore may implement beneficial effects of the foregoing method embodiments. In this application, the communication apparatus may be the user equipment shown in FIG. 1 or a module (for example, a chip) used in a terminal device (for example, user equipment), may be the authentication, authorization, and accounting function network element shown in FIG. 1, or may be the authentication anchor (namely, the session management network element, the mobility management network element, the authentication server network element, or the security anchor network element) shown in FIG. 1.

As shown in FIG. 10, a communication apparatus 1000 includes a processing module 1001 and a transceiver module 1002. The communication apparatus 1000 is configured to implement functions of the UE, the authentication, authorization, and accounting function network element, or the authentication anchor in the method embodiments shown in FIG. 2 to FIG. 9.

When the communication apparatus 1000 is configured to implement the functions of the UE in the method embodiment shown in FIG. 2, the transceiver module 1002 is configured to obtain auxiliary authentication information, where the auxiliary authentication information includes identification information of one or more networks; and the processing module 1001 is configured to: determine access information of a first network based on first temporary authentication information and identification information of the first network, and trigger mutual temporary authentication with the first network based on the access information of the first network, where the first network is any one of the one or more networks.

When the communication apparatus 1000 is configured to implement the functions of the authentication, authorization, and accounting function network element in the method embodiment shown in FIG. 2, the transceiver module 1002 is configured to receive access information of a first network from a terminal apparatus; the processing module 1001 is configured to trigger mutual temporary authentication with the communication apparatus based on the access information of the first network; and the transceiver module 1002 is further configured to receive configuration information of the first network from the first network when the mutual temporary authentication succeeds.

When the communication apparatus 1000 is configured to implement the functions of the authentication anchor in the method embodiment shown in FIG. 2, the transceiver module 1002 is configured to send, to an authentication, authorization, and accounting function network element in a first network, access information of the first network that is from a terminal apparatus, where the access information of the first network is used to trigger the communication apparatus and the authentication, authorization, and accounting function network element to perform mutual temporary authentication; and the processing module 1001 is configured to: when it is determined that the mutual temporary authentication between the communication apparatus and the first network succeeds, trigger a data management network element to send network selection subscription information of the first network to the communication apparatus.

For more detailed descriptions of the processing module 1001 and the transceiver module 1002, directly refer to the related descriptions in the method embodiment shown in FIG. 2. Details are not described herein again.

It should be understood that the processing module 1001 in this embodiment of this application may be implemented by a processor or a processor-related circuit component, and the transceiver module 1002 may be implemented by a transceiver or a transceiver-related circuit component.

Based on the foregoing content and a same concept, as shown in FIG. 11, this application further provides a communication apparatus 1100. The communication apparatus 1100 may include a processor 1101 and a transceiver 1102. The processor 1101 and the transceiver 1102 are coupled to each other. It may be understood that the transceiver 1102 may be an interface circuit or an input/output interface. Optionally, the communication apparatus 1100 may further include a memory 1103, configured to: store instructions executed by the processor 1101, store input data required by the processor 1101 to run instructions, or store data generated after the processor 1101 runs instructions.

When the communication apparatus 1100 is configured to implement the method shown in FIG. 2, the processor 1101 is configured to perform a function of the processing module 1001, and the transceiver 1102 is configured to perform a function of the transceiver module 1002.

When the communication apparatus is a chip used in a terminal device, the chip of the terminal device implements functions of the terminal device in the foregoing method embodiments. The chip of the terminal device receives information from another module (for example, a radio frequency module or an antenna) in the terminal device, where the information is sent by an access network device to the terminal device. Alternatively, the chip of the terminal device sends information to another module (for example, a radio frequency module or an antenna) in the terminal device, where the information is sent by the terminal device to an access network device.

Figure 12:
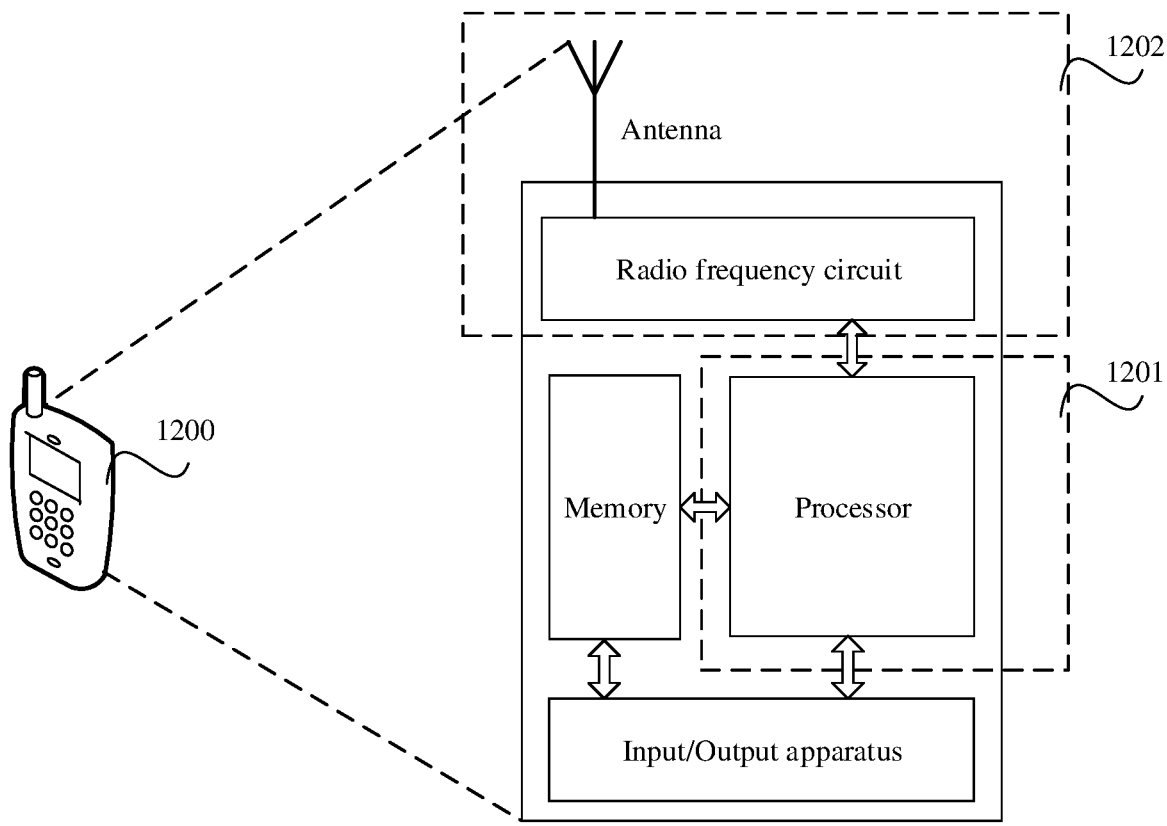
FIG. 12 is a schematic diagram of a structure of a terminal device according to an embodiment of this application.

When the communication apparatus is a terminal device, FIG. 12 is a simplified schematic diagram of a structure of the terminal device. For ease of understanding and illustration, FIG. 12 uses an example in which the terminal device is a mobile phone. As shown in FIG. 12, a terminal device 1200 includes a processor, a memory, a radio frequency circuit, an antenna, and an input/output apparatus. The processor is mainly configured to: process a communication protocol and communication data, control the entire terminal device, execute a software program, and process data of the software program, for example, configured to support the terminal device 1200 to perform the method performed by terminal device in any one of the foregoing embodiments. The memory is mainly configured to store the software program and data. The radio frequency circuit is mainly configured to: perform conversion between a baseband signal and a radio frequency signal, and process the radio frequency signal. The antenna is mainly configured to send and receive the radio frequency signal in an electromagnetic wave form. The input/output apparatus, such as a touchscreen, a display, or a keyboard, is mainly configured to: receive data input by a user and output data to the user. It should be noted that some types of terminal devices may have no input/output apparatus.

After the terminal device is powered on, the processor may read the software program in the memory, interpret and execute instructions of the software program, and process the data of the software program. When data needs to be sent, the processor performs baseband processing on the to-be-sent data, and outputs a baseband signal to the radio frequency circuit. After performing radio frequency processing on the baseband signal, the radio frequency circuit pass sends a radio frequency signal in the electromagnetic wave form through the antenna. When data is sent to the terminal device 1200, the radio frequency circuit receives a radio frequency signal through the antenna, converts the radio frequency signal into a baseband signal, and outputs the baseband signal to the processor. The processor converts the baseband signal into data, and processes the data.

In an optional implementation, the processor may include a baseband processor and a central processing unit. The baseband processor is mainly configured to process the communication protocol and the communication data. The central processing unit is mainly configured to control the entire terminal device 1200, execute the software program, and process the data of the software program. The processor in FIG. 12 integrates functions of the baseband processor and the central processing unit. It should be noted that the baseband processor and the central processing unit may alternatively be processors independent of each other, and are interconnected by using technologies such as a bus. In addition, the terminal device may include a plurality of baseband processors to adapt to different network standards, and the terminal device 1200 may include a plurality of central processing units to enhance a processing capability of the terminal device 1200. Components of the terminal device 1200 may be connected by using various buses. The baseband processor may alternatively be expressed as a baseband processing circuit or a baseband processing chip. The central processing unit may alternatively be expressed as a central processing circuit or a central processing chip. The function of processing the communication protocol and the communication data may be built in the processor, or may be stored in a storage module in a form of a software program, and the processor executes the software program to implement a baseband processing function.

In this application, the antenna and the radio frequency circuit that have sending and receiving functions may be considered as a transceiver module of the terminal device, and the processor that has a processing function may be considered as a processing module of the terminal device. As shown in FIG. 12, the terminal device includes a processing module 1201 and a transceiver module 1202. The transceiver module may also be referred to as a transceiver, a transceiver apparatus, or the like. The processing module may also be referred to as a processor, a processing board, a processing unit, a processing apparatus, or the like. Optionally, a component that is configured to implement the receiving function and that is in the transceiver module may be considered as a receiving module, and a component that is configured to implement the sending function and that is in the transceiver module may be considered as a sending module. In other words, the transceiver module includes the receiving module and the sending module. For example, the receiving module may also be referred to as a receiver, a receive circuit, or the like, and the sending module may be referred to as a transmitter, a transmit circuit, or the like.

On a downlink, a downlink signal (including data and/or control information) sent by an access network device is received through the antenna. On an uplink, an uplink signal (including data and/or control information) is sent to the access network device or another terminal device through the antenna. In the processor, service data and a signaling message are processed. These modules perform processing by using a radio access technology used in a radio access network (for example, an access technology in an LTE system, an NR system, and another evolved system). The processor is further configured to control and manage an action of the terminal device, and is configured to perform processing performed by the terminal device in the foregoing embodiments. The processor is further configured to support the terminal device to perform the method performed by the UE in FIG. 2.

It should be noted that FIG. 12 shows only one memory, one processor, and one antenna. In an actual terminal device, the terminal device may include any quantity of antennas, memories, processors, and the like. The memory may also be referred to as a storage medium, a storage device, or the like. In addition, the memory may be disposed independent of the processor, or may be integrated with the processor. This is not limited in this embodiment of this application.

It should be understood that the transceiver module 1202 is configured to perform a sending operation and a receiving operation (or referred to as an obtaining operation) on a terminal device side in the method embodiment shown in FIG. 2, and the processing module 1201 is configured to perform an operation other than the sending and receiving operations on the terminal device side in the method embodiment shown in FIG. 2. For example, the transceiver module 1202 is configured to perform the sending and receiving steps on the terminal device side in the embodiment shown in FIG. 2, for example, configured to perform step 201. The processing module 1201 is configured to perform an operation other than the sending and receiving operations on the terminal device side in the embodiment shown in FIG. 2, for example, configured to perform step 202 to step 204.

When the communication apparatus is a chip-type apparatus or circuit, the communication apparatus may include a transceiver module and a processing module. The transceiver module may be an input/output circuit and/or an interface circuit. The processing module may be a processor, a microprocessor, or an integrated circuit integrated on the chip.

Based on the foregoing content and a same concept, this application provides a communication system. The communication system may include the foregoing authentication, authorization, and accounting function network element and the foregoing authentication anchor. The authentication, authorization, and accounting function network element is configured to: receive access information of a first network from a communication apparatus through the authentication anchor, and trigger mutual temporary authentication with the communication apparatus based on the access information of the first network. The authentication anchor is configured to: when the mutual temporary authentication succeeds, trigger a data management network element to send network selection subscription information of the first network to the communication apparatus.

Further, the system includes the data management network element. The authentication anchor is specifically configured to send a subscription request indication to the data management network element when the mutual temporary authentication succeeds, where the subscription request indication indicates the data management network element to send the network selection subscription information to the communication apparatus. The data management network element is configured to: receive the subscription request indication from the authentication anchor, and send the network selection subscription information to the communication apparatus based on the subscription request indication.

For more detailed descriptions of the authentication, authorization, and accounting function network element, directly refer to the related descriptions in the foregoing method embodiment related to the AAA side. For more detailed descriptions of the authentication anchor, directly refer to the related descriptions in the foregoing method embodiment related to the authentication anchor side. For more detailed descriptions of the data management network element, directly refer to the related descriptions in the method foregoing embodiment related to the UDM side. Details are not described herein again.

It may be understood that, the processor in embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor or any conventional processor.

The method steps in embodiments of this application may be implemented by hardware, or may be implemented by the processor executing software instructions. The software instructions may include a corresponding software module. The software module may be stored in a random access memory (RAM), a flash memory, a read-only memory (ROM), a programmable read-only memory (programmable ROM, PROM), an erasable programmable read-only memory (erasable PROM, EPROM), an electrically erasable programmable read-only memory (electrically EPROM, EEPROM), a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may alternatively be a component of the processor. The processor and the storage medium may be configured in an ASIC. In addition, the ASIC may be located in the access network device or the terminal device. Certainly, the processor and the storage medium may alternatively exist as discrete components in the access network device or the terminal device.

All or a part of the foregoing embodiments may be implemented by software, hardware, firmware, or any combination thereof. When software is used to implement the embodiments, all or a part of the embodiments may be implemented in a form of a computer program product. The computer program product includes one or more computer programs or instructions. When the computer programs or the instructions are loaded and executed on a computer, the procedures or the functions according to embodiments of this application are all or partially implemented. The computer may be a general-purpose computer, a special-purpose computer, a computer network, an access network device, user equipment, or another programmable apparatus. The computer programs or the instructions may be stored in a computer-readable storage medium, or may be transmitted from a computer-readable storage medium to another computer-readable storage medium. For example, the computer programs or the instructions may be transmitted from a website, computer, server, or data center to another website, computer, server, or data center in a wired or wireless manner. The computer-readable storage medium may be any usable medium accessible by a computer, or may be a data storage device, such as a server or a data center, integrating one or more usable media. The usable medium may be a magnetic medium, for example, a floppy disk, a hard disk, or a magnetic tape, may be an optical medium, for example, a digital video disc (DVD), or may be a semiconductor medium, for example, a solid-state drive (SSD).

In embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

In this application, "and/or" describes an association relationship between associated objects, and indicates that three relationships may exist. For example, A and/or B may indicate the following three cases: Only A exists, both A and B exist, and only B exists, where A and B may be singular or plural.

It may be understood that various numbers in embodiments of this application are merely used for differentiation for ease of description, and are not used to limit the scope of embodiments of this application. The sequence numbers of the foregoing processes do not mean an execution sequence, and the execution sequences of the processes should be determined based on functions and internal logic of the processes. The terms "first", "second", and the like are used to distinguish between similar objects, and do not need to be used to describe a specific order or sequence. In addition, the terms "include", "have", and any variant thereof are intended to cover non-exclusive inclusion, for example, include a series of steps or modules. Methods, systems, products, or devices are not necessarily limited to those steps or modules that are literally listed, but may include other steps or modules that are not literally listed or that are inherent to such processes, methods, products, or devices.

Clearly, a person skilled in the art can make various modifications and variations to this application without departing from the protection scope of this application. This application is intended to cover these modifications and variations of this application provided that they fall within the scope of the claims of this application and their equivalent technologies.

What is claimed is:

1. A communication method, comprising:
   obtaining, by a terminal apparatus, auxiliary authentication information from an access network device, wherein the auxiliary authentication information comprises identification information of two or more networks including a first network;
   determining, by the terminal apparatus, access information of the first network of the two or more networks based on first temporary authentication information of the terminal apparatus and the identification information of the first network, wherein the access information of the first network is a subscription concealed identifier (SUCI);
   triggering, by the terminal apparatus, mutual temporary authentication with the first network based on the access information of the first network;
   when the mutual temporary authentication with the first network fails, determining, by the terminal apparatus, access information of a second network of the two or more networks based on the first temporary authentication information and identification information of the second network, the second network being different from the first network; and
   triggering, by the terminal apparatus, mutual temporary authentication with the second network based on the access information of the second network.

2. The method according to claim 1, wherein the auxiliary authentication information further comprises onboarding indication information corresponding to the two or more networks; and
   the method further comprises:
      selecting, by the terminal apparatus from the two or more networks, a network supporting onboarding as the first network, based on the onboarding indication information corresponding to the two or more networks.

3. The method according to claim 1, wherein obtaining, by the terminal apparatus, the auxiliary authentication information from the access network device comprises:
receiving, by the terminal apparatus, the auxiliary authentication information broadcast by the access network device.

4. The method according to claim 1, wherein the method further comprises:
selecting, by the terminal apparatus based on onboarding indication information corresponding to the two or more networks, a network supporting onboarding from the two or more networks as the second network.

5. The method according to claim 1, wherein the method further comprises:
receiving, by the terminal apparatus, an access reject message of the first network; and
selecting, by the terminal apparatus in response to the access reject message, a network supporting onboarding from the two or more networks as the second network, based on onboarding indication information corresponding to the two or more networks.

6. The method according to claim 5, wherein the access reject message includes cause information for rejecting access to the first network.

7. The method according to claim 6, wherein the cause information included in the access reject message indicates that a temporary authentication credential of the terminal apparatus is not found.

8. The method according to claim 1, wherein the mutual temporary authentication with the first network or the second network comprises fifth-generation authentication and key agreement (5G AKA), or extensible authentication protocol authentication and key agreement (EAP-AKA').

9. The method according to claim 1, wherein the method further comprises:
receiving, by the terminal apparatus from the first network, configuration information of the first network when the mutual temporary authentication succeeds.

10. The method according to claim 9, wherein the configuration information of the first network comprises network selection subscription information usable by the terminal apparatus to choose to access the first network.

11. The method according to claim 10, wherein the network selection subscription information comprises one or more of a subscription permanent identifier (SUPI), a public land mobile network identifier (PLMN ID), a network identifier (NID), a routing indicator, single network slice selection assistance information (NSSAI), or a data network name (DNN).

12. The method according to claim 9, wherein the configuration information of the first network further comprises a long-term authentication credential usable by the first network to authorize the terminal apparatus to access the first network; and
receiving, by the terminal apparatus, the configuration information of the first network from the first network when the mutual temporary authentication succeeds comprises:
determining, by the terminal apparatus, identification information of a data network in which an online subscription server is located;
sending, by the terminal apparatus, the identification information of the data network to a session management function network element; and
obtaining, by the terminal apparatus, the long-term authentication credential from the online subscription server through a user plane tunnel.

13. The method according to claim 12, wherein the auxiliary authentication information further comprises the identification information of the data network in which the online subscription server is located; and
determining, by the terminal apparatus, the identification information of the data network in which the online subscription server is located comprises:
obtaining, by the terminal apparatus, the identification information of the data network from the auxiliary authentication information.

14. A terminal apparatus comprising:
at least one processor coupled to a non-transitory memory storing instructions and configured to execute the instructions to cause the terminal apparatus to:
obtain auxiliary authentication information from an access network device, wherein the auxiliary authentication information comprises identification information of two or more networks including a first network;
determine access information of the first network of the two or more networks based on first temporary authentication information of the terminal apparatus and the identification information of the first network, wherein the access information of the first network is a subscription concealed identifier (SUCI);
trigger mutual temporary authentication with the first network based on the access information of the first network;
when the mutual temporary authentication with the first network fails, determine access information of a second network of the two or more networks based on the first temporary authentication information and identification information of the second network, the second network being different from the first network; and
trigger mutual temporary authentication with the second network based on the access information of the second network.

15. The terminal apparatus according to claim 14, wherein the auxiliary authentication information further comprises onboarding indication information corresponding to the two or more networks; and the instructions further cause the terminal apparatus to select, from the two or more networks, a network supporting onboarding as the first network, based on the onboarding indication information corresponding to the two or more networks.

16. The terminal apparatus according to claim 14, wherein the instructions further cause the terminal apparatus to receive the auxiliary authentication information broadcast by the access network device.

17. The terminal apparatus according to claim 14, wherein the instructions further cause the terminal apparatus to select, based on onboarding indication information, a network supporting onboarding from the two or more networks as the second network.

18. The terminal apparatus according to claim 14, wherein the instructions further cause the terminal apparatus to:
receive an access reject message of the first network; and
select, in response to the access reject message, a network supporting onboarding from the two or more networks as the second network based on onboarding indication information corresponding to the two or more networks.

19. The terminal apparatus according to claim 18, wherein the access reject message includes cause information for rejecting access to the first network.

20. The terminal apparatus according to claim 19, wherein the cause information included in the access reject message indicates that a temporary authentication credential of the terminal apparatus is not found.

21. A non-transitory computer readable storage medium comprising instructions that, when executed by one or more processors, cause a terminal apparatus to:
- obtain auxiliary authentication information from an access network device, wherein the auxiliary authentication information comprises identification information of two or more networks including a first network;
- determine access information of the first network of the two or more networks based on first temporary authentication information of the terminal apparatus and the identification information of the first network, wherein the access information of the first network is a subscription concealed identifier (SUCI);
- trigger mutual temporary authentication with the first network based on the access information of the first network;
- when the mutual temporary authentication with the first network fails, determine access information of a second network of the two or more networks based on the first temporary authentication information and identification information of the second network, the second network being different from the first network; and
- trigger mutual temporary authentication with the second network based on the access information of the second network.

* * * * *